(12) United States Patent
Srinivas et al.

(10) Patent No.: US 9,337,931 B2
(45) Date of Patent: May 10, 2016

(54) CONTROL AND PROVISIONING IN A DATA CENTER NETWORK WITH AT LEAST ONE CENTRAL CONTROLLER

(71) Applicant: PLEXXI INC., Nashua, NH (US)

(72) Inventors: Anand Srinivas, Arlington, MA (US); Denis H. deRuijter, Harvard, MA (US); David J. Husak, Windham, NH (US)

(73) Assignee: Plexxi Inc., Nashua, NH (US)

( * ) Notice: Subject to any disclaimer, the term of this patent is extended or adjusted under 35 U.S.C. 154(b) by 559 days.

(21) Appl. No.: 13/651,224

(22) Filed: Oct. 12, 2012

(65) Prior Publication Data

US 2013/0279909 A1 Oct. 24, 2013

Related U.S. Application Data

(63) Continuation-in-part of application No. 13/528,501, filed on Jun. 20, 2012, now Pat. No. 9,065,582, and a continuation-in-part of application No. 13/528,211, filed on Jun. 20, 2012, now Pat. No. 8,842,988.

(60) Provisional application No. 61/554,107, filed on Nov. 1, 2011.

(51) Int. Cl.
*H04L 12/721* (2013.01)
*H04B 10/27* (2013.01)
*H04Q 11/00* (2006.01)
*H04Q 3/00* (2006.01)

(52) U.S. Cl.
CPC ............ *H04B 10/27* (2013.01); *H04Q 3/0095* (2013.01); *H04Q 11/0062* (2013.01); *H04L 45/12* (2013.01); *H04Q 2011/009* (2013.01); *H04Q 2213/13106* (2013.01)

(58) Field of Classification Search
None
See application file for complete search history.

(56) References Cited

U.S. PATENT DOCUMENTS 5,008,881 A 4/1991 Karol
6,570,685 B1 5/2003 Fujita et al.
(Continued)

FOREIGN PATENT DOCUMENTS

EP 2 429 122 3/2012
WO WO 2008/073636 6/2008
(Continued)

OTHER PUBLICATIONS

A Policy-Aware Switching Layer for Data Centers, Dillip Antony Joseph, Jun. 24, 2008, Electrical Engineering and Computer Sciences, University of California at Berkeley, Technical Report No. UCB/EECS-2008-82, pp. 26.*
(Continued)

*Primary Examiner* — Bob Phunkulh
*Assistant Examiner* — Kyaw Z Soe
(74) *Attorney, Agent, or Firm* — Preti Flaherty Beliveau & Pachios LLP

(57) ABSTRACT

Data center networks that employ optical network topologies and optical nodes to efficiently allocate bandwidth within the data center networks, while reducing the physical interconnectivity requirements of the data center networks. Such data center networks employ at least one central controller for controlling and provisioning computing resources within the data center networks based at least in part on the network topology and an application component topology, thereby enhancing overall application program performance.

31 Claims, 15 Drawing Sheets

(56) References Cited

U.S. PATENT DOCUMENTS

| | | | |
|---|---|---|---|
| 6,711,324 | B1 | 3/2004 | Zang et al. |
| 7,254,138 | B2 | 8/2007 | Sandstrom |
| 7,333,511 | B2 * | 2/2008 | Sandstrom ........ H04L 12/40169 370/235 |
| 7,477,844 | B2 | 1/2009 | Gumaste et al. |
| 7,522,837 | B2 | 4/2009 | Tanobe et al. |
| 7,743,127 | B2 | 6/2010 | Santos et al. |
| 7,986,713 | B2 | 7/2011 | Sandstrom |
| 8,027,585 | B2 | 9/2011 | Yokoyama |
| 2002/0131118 | A1 | 9/2002 | Chiaroni et al. |
| 2003/0046127 | A1 | 3/2003 | Crowe et al. |
| 2004/0105364 | A1 | 6/2004 | Chow et al. |
| 2004/0131064 | A1 | 7/2004 | Burwell et al. |
| 2005/0044195 | A1 | 2/2005 | Westfall |
| 2006/0123477 | A1 | 6/2006 | Raghavan et al. |
| 2006/0165012 | A1 * | 7/2006 | Habetha .............. H04L 41/0806 370/254 |
| 2006/0228112 | A1 | 10/2006 | Palacharla et al. |
| 2006/0275035 | A1 | 12/2006 | Way |
| 2008/0062891 | A1 * | 3/2008 | Van der Merwe ...... H04L 45/04 370/254 |
| 2008/0144511 | A1 | 6/2008 | Marcondes et al. |
| 2009/0092064 | A1 * | 4/2009 | Fan ................... H04L 29/12009 370/255 |
| 2009/0138577 | A1 * | 5/2009 | Casado .................. H04L 41/06 709/220 |
| 2009/0161681 | A1 * | 6/2009 | Madrahalli ........ H04Q 11/0062 370/401 |
| 2009/0219817 | A1 | 9/2009 | Carley |
| 2009/0268605 | A1 | 10/2009 | Campbell et al. |
| 2009/0290513 | A1 * | 11/2009 | Swan ................. H04L 41/0213 370/255 |
| 2009/0296719 | A1 * | 12/2009 | Maier ..................... H04L 45/12 370/400 |
| 2009/0328133 | A1 | 12/2009 | Strassner et al. |
| 2010/0014518 | A1 | 1/2010 | Duncan et al. |
| 2010/0115101 | A1 | 5/2010 | Lain et al. |
| 2010/0121972 | A1 | 5/2010 | Samuels et al. |
| 2010/0284691 | A1 * | 11/2010 | Zottmann ........... H04J 14/0204 398/49 |
| 2011/0090892 | A1 | 4/2011 | Cooke |

FOREIGN PATENT DOCUMENTS

| | | |
|---|---|---|
| WO | WO 2008/116309 | 10/2008 |
| WO | WO 2009/042919 | 4/2009 |
| WO | WO 2009/096793 | 8/2009 |
| WO | WO 2009/151847 | 12/2009 |
| WO | WO 2010/133114 | 11/2010 |
| WO | WO 2010/138937 | 12/2010 |

OTHER PUBLICATIONS

Affinity Networking for Data Centers and Clouds solution overview, Plexxi Inc, Dec. 2012.*

A Torus-Based 4-Way Fault-Tolerant Backbone Network Architecture for Avionic WDM LANs; The Department of Electrical and Computer Engineering, University of Florida; Dexiang Wang and Janise Y. McNair; Optical Society of America; Mar. 31, 2011.

Hybrid Optical WDM Networks Utilizing Optical Waveband and Electrical Wavelength Cross-connects; Nagoya University; Hai-Chau Le, Hiroshi Hasegawa and Ken-ichi Sato; Optical Society of America; 2011.

Scalable Photonic Interconnection Network With Multiple-Layer Configuration for Warehouse-Scale Networks; NTT Network Innovation Laboratories; Toshikazu Sakano and Shuto Yamamoto; Optical Society of America; Jun. 22, 2011.

P2i-Torus: A Hybrid Architecture for Direct Interconnection; Department of Computer Science and Technology, Tsinghua University; Chao Zhang and Menghan Li; Dec. 24-26, 2011.

Making High Bandwidth But Low Revenue Per Bit Network Applications Profitable; Optimum Communications Services; Jan. 15, 2010.

A Policy-aware Switching Layer for Data Centers; Electrical Engineering and Computer Sciences, University of California at Berkeley; Dilip Antony Joseph, Arsalan Tavakoli and Ion Stoica; Jun. 24, 2008.

Optimum Communications Services: Finally a way out of the zero-sum game?; TechnologyInside on the web; Oct. 20, 2008.

Flattened Butterfly: A Cost-Efficient Topology for High-Radix Networks; John Kim, William J. Daily, Computer Systems Laboratories; Dennis Abts, Cray Inc.; 2007.

Impact of Adaptive Layer 1 for Packet Switching Network Cost and QoS; TRLabs Next Generation Internet Workshop; Mark Sandstrom; Optimum Communications; Nov. 9, 2007.

A Proposal of Hierarchical Chordal Ring Network Topology for WDM Networks; Tomoya Kitani, Nobuo Funabiki and Teruo Higashino; IEEE; 2004.

WDM-Based Local Lightwave Networks Part II: Multihop Systems; IEEE; Biswanath Mukherjee; Jul. 1992.

Abts Dennis, Kim John "High Performance Datacenter Networks, Architectures, Algorithms and Opportunities"; 2011, Morgan & Claypool Publishers; 115 pages.

Sudevalayam, Sujesha et al., "Affinity-aware Modeling of CPU Usage for Provisioning Virtualized Applications," 2011 IEEE 4th International Conference on Cloud Computing, Jul. 4, 2011, pp. 139-146, XP031934583.

* cited by examiner

CONTROL AND PROVISIONING IN A DATA CENTER NETWORK WITH AT LEAST ONE CENTRAL CONTROLLER

CROSS REFERENCE TO RELATED APPLICATIONS

This application claims benefit of the priority of U.S. Provisional Patent Application No. 61/554,107 filed Nov. 1, 2011 entitled DATA CENTER NETWORK SWITCHING. This application is a continuation-in-part of U.S. patent application Ser. No. 13/528,501 filed Jun. 20, 2012 entitled OPTICAL ARCHITECTURE AND CHANNEL PLAN EMPLOYING MULTI-FIBER CONFIGURATIONS FOR DATA CENTER NETWORK SWITCHING, and a continuation-in-part of U.S. patent application Ser. No. 13/528,211 filed Jun. 20, 2012 entitled OPTICAL JUNCTION NODES FOR USE IN DATA CENTER NETWORKS.

STATEMENT REGARDING FEDERALLY SPONSORED RESEARCH OR DEVELOPMENT

—Not applicable—

FIELD OF THE INVENTION

The present disclosure relates generally to data center network architectures and switching technologies, and more specifically to data center networks that employ optical network topologies and optical nodes to efficiently allocate bandwidth within the data center networks, while reducing the physical interconnectivity requirements of the data center networks. The present disclosure further relates to data center networks with at least one central controller for controlling and provisioning computing resources within the data center networks based at least in part on the network topology and an application component topology, thereby enhancing overall application program performance.

BACKGROUND OF THE INVENTION

In recent years, university, government, business, and financial service entities, among others, have increasingly relied upon data center networks that incorporate racks of server computers ("servers") to implement application programs ("applications") for supporting their specific operational requirements, including, but not limited to, data base management applications, document and file sharing applications, searching applications, gaming applications, and financial trading applications. Such data center networks are generally expanding in terms of the number of servers incorporated therein, as well as the networking equipment needed to interconnect the servers for accommodating the data transfer requirements of the respective applications.

Conventional data center networks typically have hierarchical architectures, in which each server co-located in a particular rack is connected via one or more Ethernet connections to a top-of-rack Ethernet switch (the "top-of-rack switch"). A plurality of such top-of-rack switches form what is referred to herein as the "access layer", which is generally the lowest level of the hierarchical network architecture. The next higher level of the hierarchy is referred to herein as the "aggregation layer", which can include a plurality of Ethernet switches (the "aggregation switch(es)") and/or Internet protocol (IP) routers. Each top-of-rack switch in the access layer can be connected to one or more aggregation switches and/or IP routers in the aggregation layer. The highest level of the hierarchy is referred to herein as the "core layer", which generally includes a plurality of IP routers (the "core switches") that can be configured to provide ingress/egress points for the data center network. Each aggregation switch and/or IP router in the aggregation layer can be connected to one or more core switches in the core layer, which, in turn, can be interconnected to one another. In such conventional data center networks, the interconnections between the racks of servers, the top-of-rack switches in the access layer, the aggregation switches/IP routers in the aggregation layer, and the core switches in the core layer, are typically implemented using point-to-point Ethernet links.

Although conventional data center networks like those described above have been employed to satisfy the operational requirements of many university, government, business, and financial service entities, such conventional data center networks have drawbacks. For example, data communications between servers that are not co-located within the same rack may experience excessive delay (also referred to herein as "latency") within the data center networks, due to the multitude of switches and/or routers that the data may be required to traverse as it propagates "up", "down", and/or "across" the hierarchical architecture of the networks. Data communications between such servers may also experience latency within the respective switches and/or routers of the data center networks due to excessive node and/or link utilization. Further, because multiple paths may be employed to deliver broadcast and/or multicast data to different destinations within the data center networks, such broadcast and/or multicast data may experience excessive latency skew. Such latency and/or latency skew may be exacerbated as the sizes of the data center networks and/or their loads increase.

In addition, conventional data center networks typically include network management systems that employ configuration data for proper allocation of computing resources within the data center networks. However, such configuration data frequently lack contextual information, such as how the topology of a data center network should be configured in view of the available computing resources to achieve a desired level of application performance. For example, such network management systems may employ the Open Virtualization Format (also referred to herein as the "OVF standard") to facilitate the control and provisioning of such computing resources. However, the OVF standard generally lacks contextual information pertaining to the network topology, and may therefore be incapable of assuring that the available computing resources are being properly provisioned for the desired application performance level. As a result, problems with latency, data bottlenecks, etc., may be further exacerbated, thereby slowing down or otherwise inhibiting data movement within the data center networks.

It would therefore be desirable to have data center networks that avoid at least some of the drawbacks of the conventional data center networks described above.

BRIEF SUMMARY OF THE INVENTION

In accordance with the present disclosure, data center networks are disclosed that can employ optical network topologies and optical nodes to efficiently allocate bandwidth within the data center networks, while reducing the physical interconnectivity requirements of the data center networks. Such data center networks employ at least one central controller for controlling and provisioning computing resources within the data center networks based at least in part on the network topology and an application component topology, thereby enhancing overall application program performance.

In one aspect, a data center network architecture can include one or more physical or logical optical ring networks. Each of the optical ring networks includes a plurality of optical nodes, in which at least two optical nodes each have an associated local co-resident controller. The data center network architecture further includes one or more central controllers, zero, one, or more governing central controllers, a functional component referred to herein as the "affinity modeling component", and an affinity-network topology database. Each of the co-resident controllers associated with the physical or logical optical ring networks is communicably coupled to a respective one of the central controllers. Each co-resident controller is operative to send one or more messages to the respective central controller communicably coupled thereto. Moreover, each of the central controllers is operative to receive and process the messages sent to it by the co-resident controllers, and to control the respective co-resident controllers.

Each governing central controller can be communicably coupled to one or more of the central controllers. In an exemplary aspect, the governing central controller, the central controllers, and the local co-resident controllers can be configured to provide a hierarchy of network control. For example, the governing central controller may control the respective central controllers to perform load balancing with regard to the network traffic carried on the optical ring networks. In addition, the governing central controller and the central controllers are each operative to receive information pertaining to the affinity-network topology from the affinity-network topology database. Having received the affinity-network topology information, the central controllers, in conjunction with the governing central controller, can control some or all of the co-resident controllers to modify and/or implement the affinity-network topology across the respective optical ring networks.

In another aspect, the affinity modeling component includes a plurality of functional components operative to model the affinity-network topology. In an exemplary aspect, the plurality of functional components can include at least an affinity element harvester, a network topology harvester, an affinity topology calculator, and an affinity-network topology calculator. The affinity element harvester is operative to harvest information pertaining to one or more affinity elements, along with their mappings to one or more physical elements within the physical or logical optical ring networks. Each such affinity element is defined herein as an application component that may be virtualized (e.g., virtual machines, virtualized storage blocks, etc.) or non-virtualized (e.g., physical storage servers, units of non-virtualized software running on hardware platforms, hardware firewalls, hardware load balancers, etc.). Further, each affinity element can be a member of an affinity group, which is defined herein as a collection of servers or virtual machines (VMs), a cluster (e.g., a set of servers that are load balanced and provide high availability), and/or data center resident (or between multiple data centers) applications that require persistent interconnectivity bandwidth, low latency, multicast or broadcast services, and/or isolation from other services. The network topology harvester is operative to harvest information pertaining to the topology of the data center network architecture. The affinity topology calculator is operative to employ at least (1) the information pertaining to the affinity elements and their mappings to the physical elements within the network, (2) the information pertaining to the network topology, and/or (3) information pertaining to a user's specific application requirements, to compute, calculate, derive, or otherwise obtain a logical topology (also referred to herein as the "affinity topology") describing a functional and/or performance-driven relationship between the affinity groups and/or the affinity elements. For example, the affinity topology can specify policies and attributes that describe communications between a plurality of application components in the network.

Using at least the information pertaining to the network topology and the affinity topology, the affinity-network topology calculator is operative to form or otherwise obtain an affinity-network topology that takes into account both the network topology and the affinity topology. The affinity-network topology is a topology model that represents a combination of the network topology and the affinity topology, which can be obtained by logically combining, e.g., by logically stitching together or overlaying, the network and affinity topologies. For example, the affinity-network topology calculator may logically stitch together the network and affinity topologies by binding affinity elements to their counterparts in the network topology, yielding one or more logical links between the affinity groups/elements and the physical and/or virtualized elements within the data center network architecture. The central controllers are operative to receive information pertaining to the affinity-network topology, and, based at least on the received information, to control one or more optical nodes, and zero, one, or more optical junction nodes, to modify the network topology, as appropriate, for implementing the affinity-network topology within the data center network, thereby providing enhanced levels of application program performance and network utilization.

In a further aspect, such modification of the network topology and implementation of the affinity-network topology can be achieved by the central controller using a topology fitting engine. In an exemplary aspect, the topology fitting engine can receive, as inputs, information pertaining to the current network topology, as well as the affinity topology, from the affinity-network topology database. The topology fitting engine can further receive, as inputs, information pertaining to a supplemental non-affinity-network configuration, including various network statistics and circuit switch configuration capabilities. In addition, the topology fitting engine can provide, as outputs, information pertaining to the settings for a circuit switch within each optical node that can affect at least the underlying physical topology, a list of candidate forwarding trees provisioned to each optical node as well as a mapping of each destination address to a candidate forwarding tree, and a list of candidate forwarding paths for each network traffic flow provisioned to optical nodes along those paths as well as a mapping of each network traffic flow to a candidate forwarding path.

Such candidate forwarding paths and trees, along with appropriate mapping functions for each optical node, can define a general framework for achieving a desired data packet forwarding behavior. Such a general framework can provide for the aggregation of addresses and affinity flows by having multiple addresses/flows map to a single candidate forwarding path or tree. Moreover, the lists of candidate forwarding paths and trees can provide a convenient way of granular load balancing by assuring that all of the optical nodes are provisioned with the same lists of candidate forwarding paths/trees, using a consistent mapping function (e.g., a hash function). In addition, the optical nodes can use the lists of candidate forwarding paths and trees to autonomously switch from active forwarding paths/trees to backup forwarding paths/trees.

Because there can be up to several hundreds of thousands, if not more, unique addresses and affinity flows in a typical data center network, it may be problematic for a central controller to provision candidate forwarding paths/trees for each destination address or affinity flow within the network. In an exemplary aspect, to avoid having to provision such a potentially large number of candidate forwarding paths/trees to each optical node in the data center network, the central controller can define what is referred to herein as an "abstract endpoint" for each optical node communicably coupled thereto. Specifically, the central controller can map appropriate source/destination abstract endpoint pairs to the respective candidate forwarding paths, and further map appropriate destination abstract endpoints to the respective candidate forwarding trees, without having to directly map the numerous individual MAC addresses and network traffic flows.

In another aspect, a controller for computing and provisioning one or more forwarding topologies in a network for enhanced application program performance and network utilization includes a topology fitting engine. The network has an associated topology and a current network state, which, as employed herein, pertains to the operational status of all of the network segments in the network and the sources and destinations to which that operational status relates, as well as the endpoint addresses (such as MAC or IP addresses) of all of the host computers communicably coupled to the respective nodes on the network. A "network segment" is defined herein as a unidirectional link in the network from a source to a destination considered at the applicable OSI model layer, e.g., layer-1, layer-2, or layer-3. The topology associated with the network includes a network topology and an affinity topology, which specifies policies and attributes that describe communications between a plurality of application components. The topology fitting engine is operative to receive information pertaining to at least an affinity-network topology that represents a logical combination of the network topology and the affinity topology, and to compute one or more forwarding topologies based at least in part on the affinity-network topology. Each forwarding topology identifies one or more network segments for forwarding traffic through the network. The topology fitting engine is further operative to provide the forwarding topologies for use in deterministically arriving at a consistent end-to-end forwarding configuration for the network as a function of the current network state.

In a further aspect, a method of computing and provisioning one or more forwarding topologies in a network for enhanced application program performance and network utilization includes receiving, at a controller, information pertaining to at least an affinity-network topology, and computing, by the controller, one or more forwarding topologies based at least in part on the affinity-network topology. The method further includes providing, by the controller, the forwarding topologies for use in deterministically arriving at the consistent end-to-end forwarding configuration for the network as a function of the current network state.

In still another aspect, the topology fitting engine is further operative to provide end-to-end forwarding topologies to each local controller to pre-provision the end-to-end forwarding topologies at the respective local controllers. Each end-to-end forwarding topology is based at least in part on the affinity topology and the current network state. Each local controller is independently operative to deterministically select and utilize at least one of the end-to-end forwarding topologies as an initial forwarding topology, and to maintain the non-selected end-to-end forwarding topologies as alternative forwarding topologies. Each local controller is further operative, in response to a change in the network state, to deselect the initial forwarding topology, and to independently and deterministically select and utilize at least one of the alternative forwarding topologies in place of the initial forwarding topology, wherein the alternative forwarding topologies selected at each local controller are the same alternative forwarding topologies.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIGS. 9b-9d are diagrams of a plurality of topology planes that constitute the topology graph of FIG. 9a;

FIG. 10b is a block diagram illustrating details of the central controller of FIG. 10a, and a plurality of optical nodes containing the respective co-resident controllers of FIG. 10a;

DETAILED DESCRIPTION OF THE INVENTION

The disclosures of U.S. patent application Ser. No. 13/651,213 filed Oct. 12, 2012 entitled DATA CENTER NETWORK ARCHITECTURE, U.S. patent application Ser. No. 13/651,212 filed Oct. 12, 2012 entitled AFFINITY MODELING IN A DATA CENTER NETWORK, U.S. patent application Ser. No. 13/651,255 filed Oct. 12, 2012 entitled HIERARCHY OF CONTROL IN A DATA CENTER NETWORK, U.S. Provisional Patent Application No. 61/554,107 filed Nov. 1, 2011 entitled DATA CENTER NETWORK SWITCHING, U.S. patent application Ser. No. 13/528,501 filed Jun. 20, 2012 entitled OPTICAL ARCHITECTURE AND CHANNEL PLAN EMPLOYING MULTI-FIBER CONFIGURATIONS FOR DATA CENTER NETWORK SWITCHING, and U.S. patent application Ser. No. 13/528,211 filed Jun. 20, 2012 entitled OPTICAL JUNCTION NODES FOR USE IN DATA CENTER NETWORKS, are incorporated herein by reference in their entirety.

Data center networks are disclosed that can employ optical network topologies and optical nodes to efficiently allocate bandwidth within the data center networks, while reducing the physical interconnectivity requirements of the data center networks. Such data center networks employ at least one central controller for controlling and provisioning computing resources within the data center networks based at least in part on the network topology and an application component topology. Such control and provisioning of computing resources includes determining a combined affinity-network topology for a data center network, and controlling one or more optical nodes, and zero, one, or more optical junction nodes, to implement the affinity-network topology within the data center network, thereby providing an enhanced level of application program performance.

Figure 1:
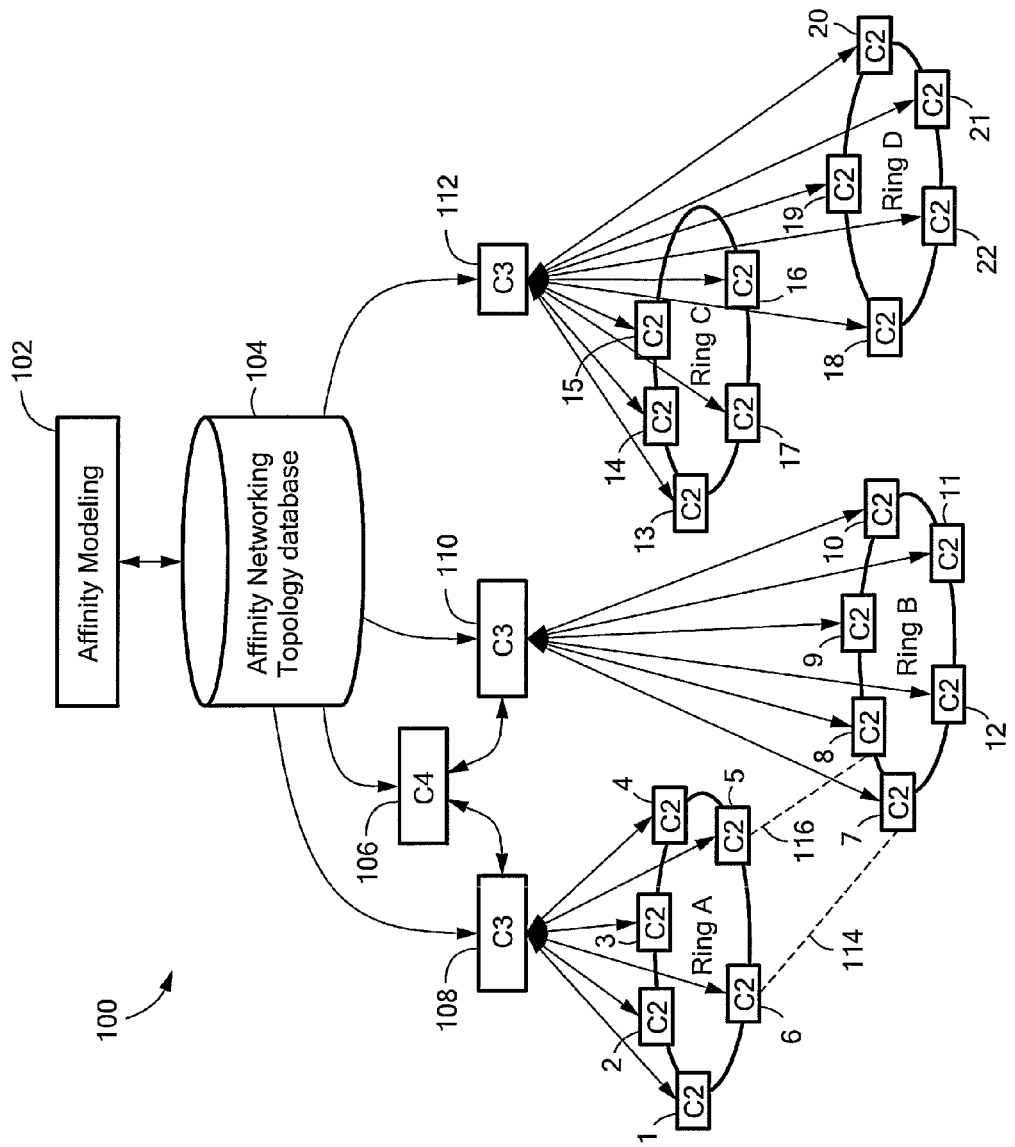
FIG. 1 is a block diagram of an exemplary data center network architecture, in accordance with the present disclosure.

FIG. 1 depicts an illustrative embodiment of a data center network 100. As shown in FIG. 1, the data center network 100 includes a plurality of physical or logical optical ring networks A, B, C, and D. Each of the optical ring networks A, B, C, D includes a plurality of optical nodes, each of which is defined herein as a network node that can include downlink ports for connection to host computers or other attached devices, uplink ports that are connectable to other optical nodes in the network, and a packet switch, a circuit switch, and/or an optical switch, as herein described. Each optical node has an associated co-resident controller (also referred to herein as "C2"). For example, the optical ring network A includes six (6) optical nodes 1-6 that have six (6) associated co-resident controllers (C2), respectively; the optical ring network B includes six (6) optical nodes 7-12 that have six (6) associated co-resident controllers (C2), respectively; the optical ring network C includes five (5) optical nodes 13-17 that have five (5) associated co-resident controllers (C2), respectively; and, the optical ring network D includes five (5) optical nodes 18-22 that have five (5) associated co-resident controllers (C2), respectively. The respective optical nodes can further include packet switches and multicast/broadcast capable circuit switches (such as electrical cross-point or electrical cross-bar switches) to increase the functionality of the optical nodes and the network in which they are deployed, allowing capacity to be shifted and switch hop counts to be reduced based on network traffic, application requirements, and/or deployment requirements. The data center network 100 further includes a plurality of central controllers 108, 110, 112 (also referred to herein as "C3"), a governing central controller 106 (also referred to herein as "C4"), a functional component 102 referred to herein as the "affinity modeling component", and an affinity-network topology database 104. It is noted that the data center network 100 may alternatively include any other suitable physical or logical network configuration(s), including, but not limited to, linear network configuration(s), ring network configuration(s), chordal ring network configuration(s), multidimensional chordal ring network configuration(s), and/or 2-dimensional or higher torus network configuration(s). It is further noted that such physical or logical network configuration(s) may include optical node(s), non-optical node(s), node(s) coupled to optical network(s), or node(s) coupled to non-optical network(s).

Each of the co-resident controllers (C2) associated with the optical ring networks A, B, C, and D is communicably coupled to a respective one of the central controllers (C3) 108, 110, 112. For example, the co-resident controllers (C2) associated with the optical ring network A are each communicably coupled to the central controller (C3) 108, and the co-resident controllers (C2) associated with the optical ring network B are each communicably coupled to the central controller (C3) 110. Further, the co-resident controllers (C2) associated with the optical ring network C are each communicably coupled to the central controller (C3) 112, and, likewise, the co-resident controllers (C2) associated with the optical ring network D are each communicably coupled to the central controller (C3) 112. Each co-resident controller (C2) can send one or more messages to the respective central controller (C3) communicably coupled thereto. Moreover, each of the central controllers (C3) 108, 110, 112 can receive and process the messages sent to it by the co-resident controllers (C2), and control the respective co-resident controllers (C2). As shown in FIG. 1, each of the central controllers (C3) 108, 110, 112 can control the respective co-resident controllers (C2) included in one or more of the optical ring networks A, B, C, D. For example, the central controller (C3) 108 can control the co-resident controllers (C2) associated with the optical ring network A, the central controller (C3) 110 can control the co-resident controllers (C2) associated with the optical ring network B, and the central controller (C3) 112 can control the co-resident controllers (C2) associated with the optical ring networks C, D.

As further shown in FIG. 1, the governing central controller (C4) 106 is communicably coupled to the central controller (C3) 108 and the central controller (C3) 110. The governing central controller (C4) 106 is operative to control the central controllers (C3) 108, 110 communicably coupled thereto. For example, the governing central controller (C4) 106 may control the central controllers (C3) 108, 110 to perform load balancing with regard to the network traffic carried on the optical ring networks A, B. In addition, each of the governing central controller (C4) 106, the central controller (C3) 108, the central controller (C3) 110, and the central controller (C3) 112 can receive information pertaining to the affinity-network topology from the affinity-network topology database 104. Having received the affinity-network topology information, the central controllers (C3) 108, 110, 112, in conjunction with the governing central controller (C4) 106, can control some or all of the co-resident controllers (C2) to modify and/or implement the affinity-network topology across the respective optical ring networks A, B, C, D.

Figure 2:
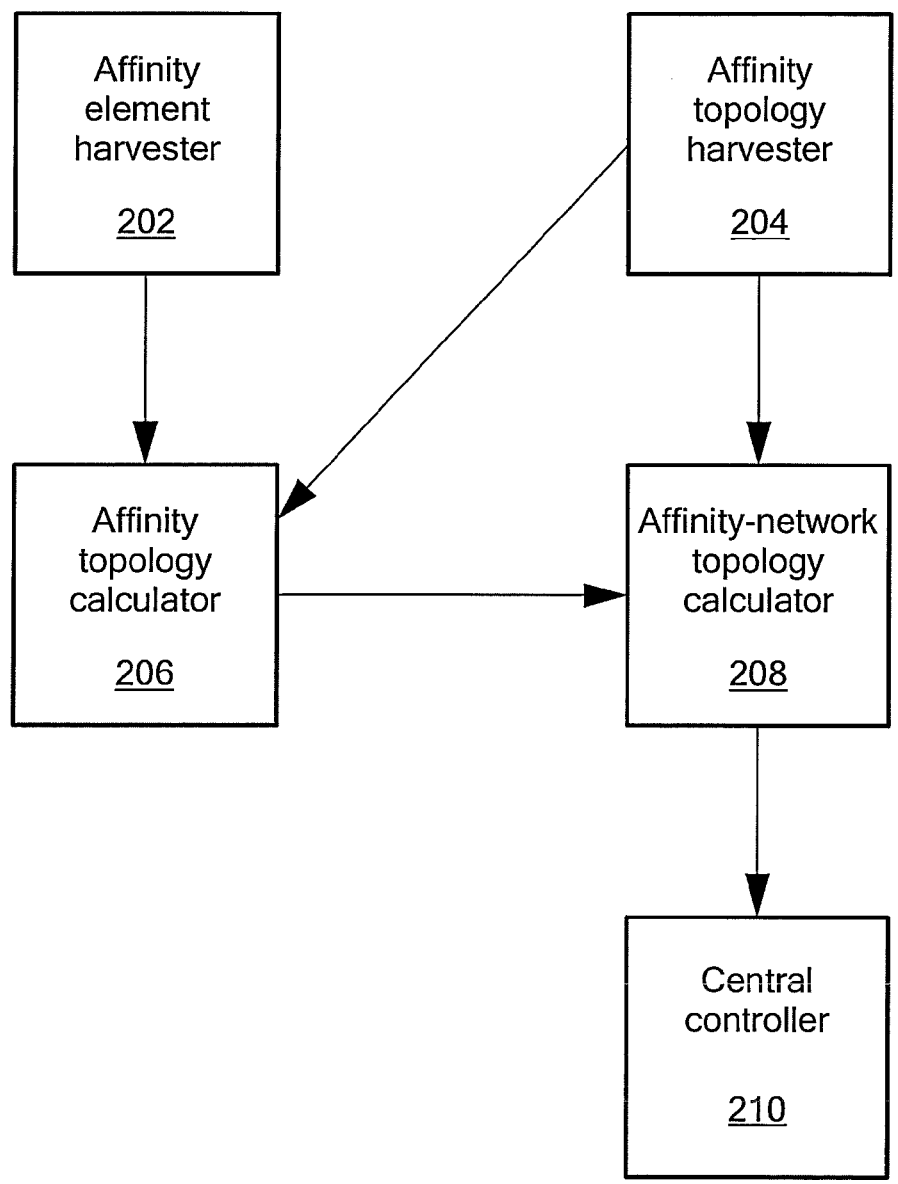
FIG. 2 is a block diagram of a plurality of exemplary functional components that can be employed to modify and/or implement an affinity-network topology within the data center network architecture of FIG. 1.

The affinity modeling component 102 (see FIG. 1) includes a plurality of functional components operative to model the affinity-network topology. FIG. 2 depicts a plurality of such functional components (corresponding to reference numerals 202, 204, 206, 208; see FIG. 2) that can be included in the affinity modeling component 102. As shown in FIG. 2, the plurality of functional components can include an affinity element harvester 202, a network topology harvester 204, an affinity topology calculator 206, and an affinity-network topology calculator 208. The affinity element harvester 202 can harvest information pertaining to one or more affinity elements, along with their mappings to one or more physical elements within at least one network (such as at least one of the physical or logical optical ring networks A, B, C, D; see FIG. 1). Each such affinity element is defined herein as an application component that may be virtualized (e.g., virtual machines, virtualized storage blocks, etc.) or non-virtualized (e.g., physical storage servers, units of non-virtualized software running on hardware platforms, hardware firewalls, hardware load balancers, etc.). Further, each affinity element can be a member of an affinity group, which is defined herein as a collection of servers or virtual machines (VMs), a cluster (e.g., a set of servers that are load balanced and provide high availability), and/or data center resident applications that require persistent interconnectivity bandwidth, low latency, multicast or broadcast services, and/or isolation from other services.

With reference to FIG. 2, the network topology harvester 204 can harvest information pertaining to the topology of a network (also referred to herein as the "network topology"), such as the data center network 100 (see FIG. 1). The affinity topology calculator 206 can employ at least (1) the information pertaining to the affinity elements and their mappings to the physical elements within the network, (2) the information pertaining to the network topology, and/or (3) information pertaining to specific requirements for application performance, to compute, calculate, derive, or otherwise obtain a logical topology (also referred to herein as the "affinity topology") describing a functional and/or performance-driven relationship between the affinity groups/elements.

Using at least the information pertaining to the network topology and the affinity topology, the affinity-network topology calculator 208 can form or otherwise obtain an affinity-network topology that takes into account both the network topology and the affinity topology. The affinity-network topology is a topology model that represents a combination of the network topology and the affinity topology, which can be obtained by logically stitching together or overlaying the network and affinity topologies. For example, the affinity-network topology calculator 208 may logically stitch together the network topology and the affinity topology by binding affinity elements to their counterparts in the network topology, yielding one or more logical links between the affinity groups/elements and the physical and/or virtualized elements within the data center network 100 (see FIG. 1). At least one central controller, such as a representative central controller 210 (see FIG. 2), can receive information pertaining to the affinity-network topology from the affinity-network topology calculator 208, and, based at least on the received information, control one or more optical nodes, and zero, one, or more optical junction nodes, and modify the network topology, as appropriate, for implementing the affinity-network topology within the data center network, thereby providing an enhanced level of application program performance. Optical junction nodes are defined herein as optical nodes that do not include a packet switch interconnecting with downlink and uplink ports. Such optical junction nodes can connect to one or more other optical junction nodes, as well as to one or more optical nodes, through their uplink ports. It is noted that such optical junction nodes may or may not include downlink ports (access ports). Such optical junction nodes can also connect to one or more external switches or routers through their downlink ports.

Figure 3:
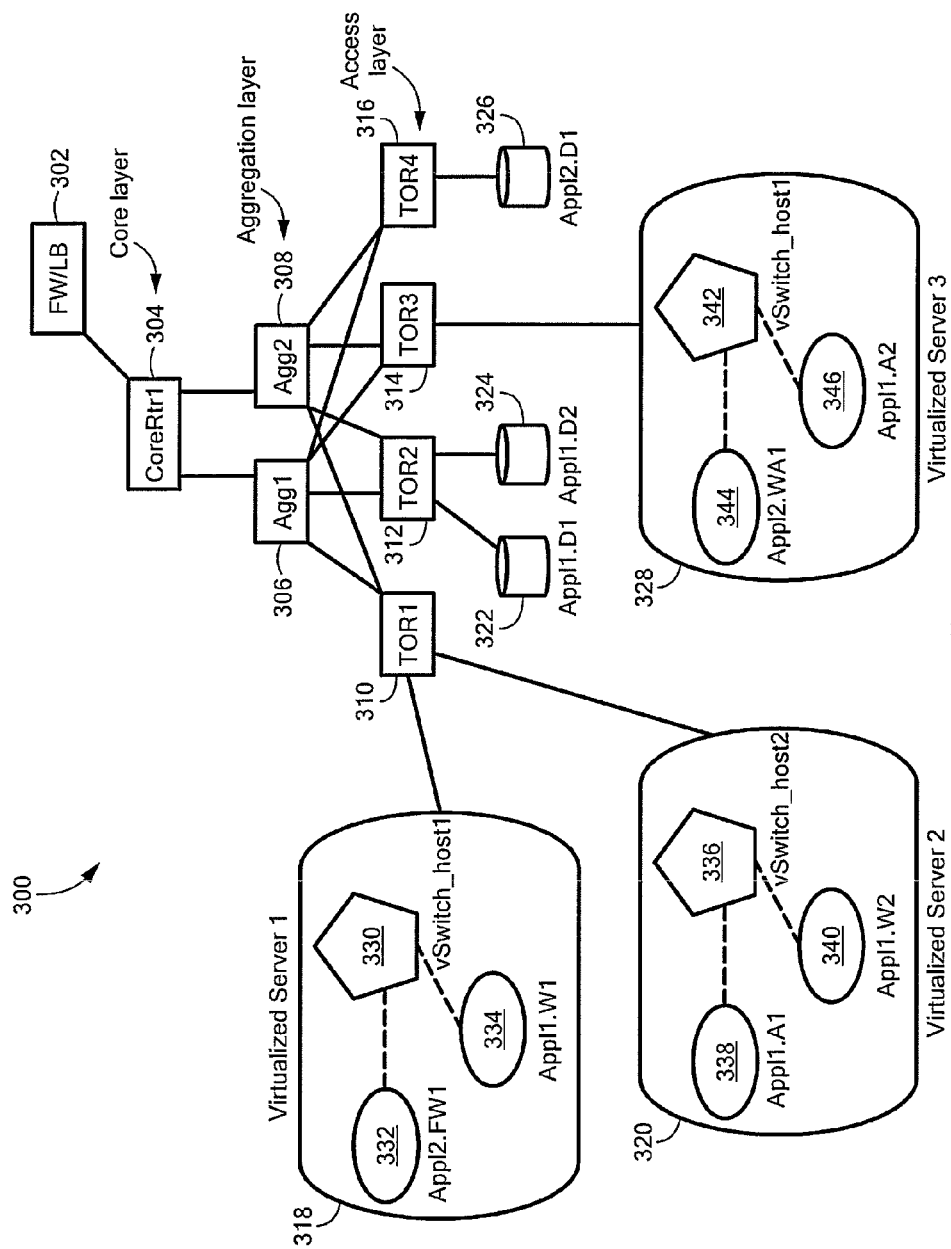
FIG. 3 is a block diagram of an exemplary network topology.
Figure 4:
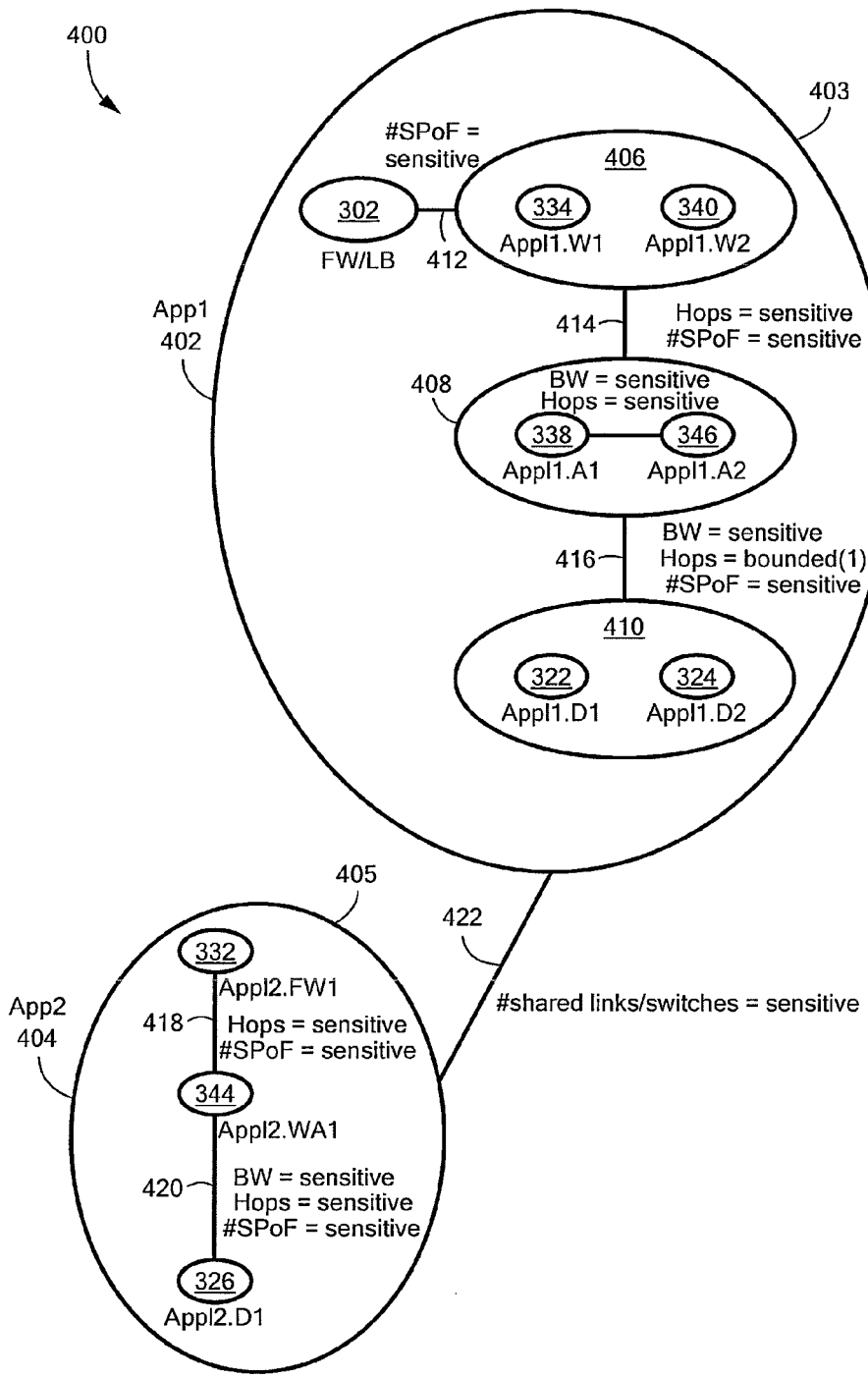
FIG. 4 is a block diagram of an exemplary logical affinity topology derived from the network topology of FIG. 3.

The operation of the affinity modeling component 102 of FIG. 1 is further described below with reference to the following illustrative example and FIGS. 3-6. In this example, an exemplary network topology 300 is illustrated in FIG. 3, and an exemplary affinity topology 400 is illustrated in FIG. 4. The affinity topology 400 includes a first plurality of affinity elements within a first exemplary application, App1 402, and a second plurality of affinity elements within a second exemplary application, App2 404.

As shown in FIG. 3, the network topology 300 includes a core layer, an aggregation layer, and an access layer. The network topology 300 further includes a plurality of exemplary network elements, namely, a firewall/load balancer (FW/LB) 302, a core router (CoreRtr1) 304 in the core layer, a plurality of aggregation servers (Agg1, Agg2) 306, 308 in the aggregation layer, and a plurality of top-of-rack servers (TOR1, TOR2, TOR3, TOR4) 310, 312, 314, 316 in the access layer. The top-of-rack server 310 is communicably coupled to a first virtual machine (virtualized server 1) 318 and a second virtual machine (virtualized server 2) 320, and the top-of-rack server 314 is communicably coupled to a third virtual machine (virtualized server 3) 328. A virtual machine ("VM") is defined herein as a software entity that provides functionality to applications, and is substantially equivalent to the functionality of a dedicated, hardware computing platform (e.g., a server). Such a virtual machine generally requires a hypervisor (e.g., a host operating system) to be installed on the actual hardware platform where it resides. It is noted that one or more virtual machines can be installed on top of a single hypervisor.

The first VM 318 is associated with a virtual switch (vSwitch_host1) 330, a first web server 334 for the first application (Appl1.W1), and a firewall 332 for the second application (Appl2.FW1). The second VM 320 is associated with a virtual switch (vSwitch_host2) 336, a first application server 338 for the first application (Appl1.A1), and a second web server 340 for the first application (Appl1.W2). The third VM 328 is associated with a virtual switch (vSwitch_host1) 342, a web server 344 for the second application (Appl2.W1), and a second application server 346 for the first application (Appl1.A2). A virtual switch ("vSwitch") is defined herein as a software entity that provides networking functionality to a group of VMs and/or other vSwitches, and is substantially equivalent to the functionality provided by a physical circuit switch to a group of physical machines and/or other physical switches. It is noted that different implementations of vSwitches can have varying levels of functionality, e.g., some implementations of a vSwitch may not implement a spanning tree protocol, and/or may not allow vSwitch-to-vSwitch connections. Similarly, while some implementations of a vSwitch are on top of a single hypervisor and are bound to VMs on the same hypervisor, other implementations include a distributed vSwitch that can be spread across multiple hypervisors, and/or can be bound to VMs that exist on different hypervisors.

It is noted that, with reference to the first VM 318, the firewall 332 and the first web server 334 are each typically communicably coupled to the virtual switch 330 through a virtual network interface card ("vNIC"). Similarly, with reference to the second VM 320, the first application server 338 and the second web server 340 are each typically communicably coupled to the virtual switch 336 through a vNIC; and, with reference to the third VM 328, the web server 344 and the second application server 346 are each typically communicably coupled to the virtual switch 342 through a vNIC. A vNIC is defined herein as a software entity that provides functionality to a virtual machine (VM), and is substantially equivalent to the functionality provided by a physical network interface card (NIC) to a physical machine.

As further shown in FIG. 3, the top-of-rack server 312 is communicably coupled to a first data store 322 for the first application (Appl1.D1), and a second data store 324 for the first application (Appl1.D2). Similarly, the top-of-rack server 316 is communicably coupled to a data store 326 for the second application (Appl2.D1).

As shown in FIG. 4, the first plurality of affinity elements within the first application, App1 402, includes the firewall/load balancer 302, the first web server 334, the second web server 340, the first application server 338, the second application server 346, the first data store 322, and the second data store 324. Moreover, the second plurality of affinity elements within the second application, App2 404, includes the firewall 332, the web server 344, and the data store 326. For example, with reference to the first application, App1 402, the firewall/load balancer 302, the first web server 334, the second web server 340, the first application server 338, the second application server 346, the first data store 322, and the second data store 324 can be members of an affinity group 403. Similarly, with reference to the second application, App2 404, the firewall 332, the web server 344, and the data store 326 can be members of an affinity group 405. In addition, the first web server 334 and the second web server 340 can be members of an affinity group 406, the first application server 338 and the second application server 346 can be members of an affinity group 408, and the first data store 322 and the second data store 324 can be members of an affinity group 410. As illustrated in FIG. 4, each of the affinity groups 406, 408, 410 is contained within the affinity group 403.

With further reference to the first application, App1 402, it is noted that one or more affinity requirements can be established for an affinity link 412 coupling the firewall/load balancer 302 to the affinity group 406, an affinity link 414 coupling the affinity group 406 to the affinity group 408, and an affinity link 416 coupling the affinity group 408 to the affinity group 410. With further reference to the second application, App2 404, one or more affinity requirements can also be established for an affinity link 418 coupling the firewall 332 to the web server 344, and an affinity link 420 coupling the web server 344 to the data store 326. In addition, one or more affinity requirements can be established for an affinity link 422 coupling the affinity group 403 to the affinity group 405. Such affinity requirements can include (1) communication-related affinity requirements relating to bandwidth, switch hops, layer-1 hops, latency, multicast dispersion, oversubscription, underlying network state, etc., (2) reliability-related affinity requirements relating to layer-2 switch failures, layer-3 router failures, link failures, single points of failure, etc., (3) security-related affinity requirements relating to shared physical machines, shared switches, isolation, communication path interconnection, etc., and/or any other suitable affinity requirements. As employed herein, the terms "layer-1", "layer-2", and "layer-3" correspond to the physical layer, the data link layer, and the network layer, respectively, of the Open System interconnection (OSI) model.

For example, with regard to the first application, App1 402, the affinity link 412 coupling the firewall/load balancer 302 to the affinity group 406 can have a reliability-related affinity requirement relating to single points of failure ("#SPoF=sensitive"), the affinity link 414 coupling the affinity group 406 to the affinity group 408 can have a communication-related affinity requirement relating to hops ("Hops=sensitive") and a reliability-related affinity requirement relating to single points of failure ("#SPoF=sensitive"), and the affinity link 416 coupling the affinity group 408 to the affinity group 410 can have two communication-related affinity requirements relating to bandwidth ("BW=sensitive") and hops ("Hops=bounded(1)"), and a reliability-related affinity requirement relating to single points of failure ("#SPoF=sensitive"). With regard to the second application, App2 404, the affinity link 418 coupling the firewall 332 to the web server 344 can have a communication-related affinity requirement relating to hops, ("Hops=sensitive") and a reliability-related affinity requirement relating to single points of failure ("#SPoF=sensitive"), and the affinity link 420 coupling the web server 344 to the data store 326 can have two communication-related affinity requirements relating to bandwidth ("BW=sensitive") and hops ("Hops=sensitive"), and a reliability-related affinity requirement relating to single points of failure ("#SPoF=sensitive"). In addition, the affinity link 422 coupling the affinity group 403 to the affinity group 405 can have a security-related affinity requirement relating to the number of shared links between the respective affinity groups 403, 405.

With reference to FIG. 2, the network topology harvester 204 can harvest information pertaining to the network topology 300 (see FIG. 3). Further, the affinity element harvester 202 (see FIG. 2) can harvest information pertaining to the first plurality of affinity elements within the first application, App1 402 (see FIG. 4), and the second plurality of affinity elements within the second application, App2 404 (see FIG. 4). The affinity topology calculator 206 (see FIG. 2) can employ at least (1) the information pertaining to the first and second pluralities of affinity elements and their mappings to the physical elements within the network topology 300, (2) the information pertaining to the network topology 300, and/or (3) information pertaining to specific application requirements, to compute, calculate, derive, or otherwise obtain the affinity topology 400 (see FIG. 4).

Figure 5:
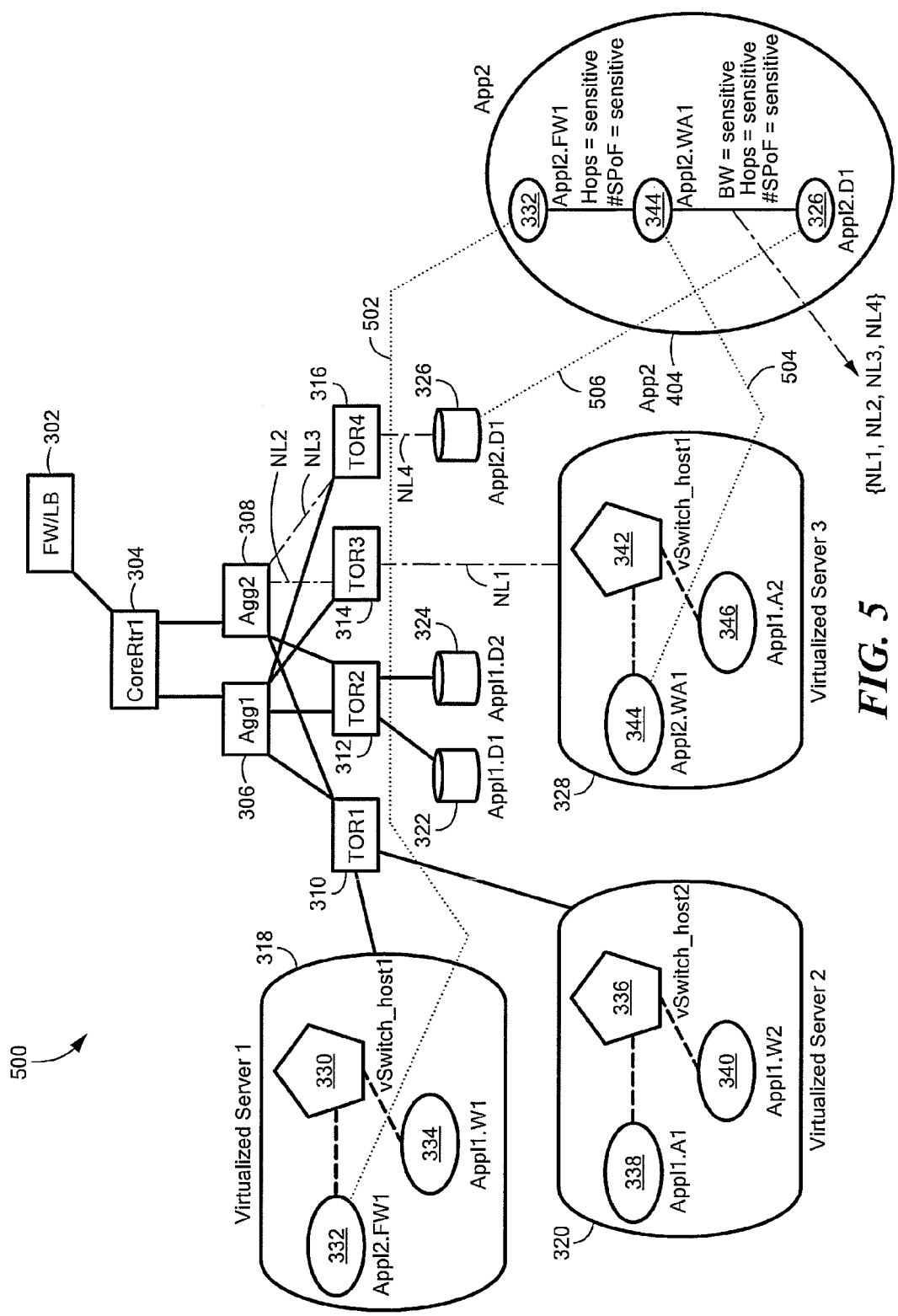
FIG. 5 is a block diagram of an exemplary affinity-network topology obtained by logically stitching together or overlaying the network topology of FIG. 3 and the logical affinity topology of FIG. 4.

With further reference to FIG. 2, the affinity-network topology calculator 208 can logically stitch together or overlay the network topology 300 (see FIG. 3) and the affinity topology 400 (see FIG. 4) to obtain an exemplary combined affinity-network topology 500, as illustrated in FIG. 5. The affinity-network topology 500 includes a portion of the affinity topology 400 (see FIG. 4) relating to the second application, App2 404, overlaid upon the network topology 300 (see FIG. 3). It is noted that the portion of the affinity topology 400 relating to the first application, App1 402, is omitted from affinity-network topology 500 of FIG. 5 for clarity of illustration. Within the affinity-network topology 500, the firewall 332 of the second application, App2 404, corresponds to the firewall 332 associated with the first VM 318 (as indicated by a link 502), the web server 344 of the second application, App2 404, corresponds to the web server 344 associated with the third VM 328 (as indicated by a link 504), and the data store 326 of the second application, App2 404, corresponds to the data store 326 communicably coupled to the top-of-rack server 316 (as indicated by a link 506). It is noted that, within the affinity-network topology 500, each affinity element of the affinity topology 400 (see FIG. 4), and each network element of the network topology 300 (see FIG. 3), is referred to herein as an affinity-network node. Further, each of the links 502, 504, 506 is referred to herein as an association link.

With regard to the affinity link 420 (see FIG. 4) coupling the web server 344 to the data store 326 of the second application, App2 404, the two communication-related affinity requirements relating to bandwidth ("BW=sensitive") and hops ("Hops=sensitive"), and the reliability-related affinity requirement relating to single points of failure ("#SPoF=sensitive"), have corresponding affinity requirements associated with (1) a network link, NL1, coupling the top-of-rack server 314 to the third VM 328, (2) a network link, NL2, coupling the aggregation server 308 to the top-of-rack server 314, (3) a network link, NL3, coupling the aggregation server 308 to the top-of-rack server 316, and (4) a network link, NL4, coupling the top-of-rack server 316 to the data store 326. It is noted that each network link (e.g., the network links NL1, NL2, NL3, NL4) in the network topology 300, each affinity link 412, 414, 416, 418, 420, 422 in the affinity topology 400, and each association link 502, 504, 506 in the affinity-network topology 500, is referred to herein as an affinity-network link.

Figure 6:
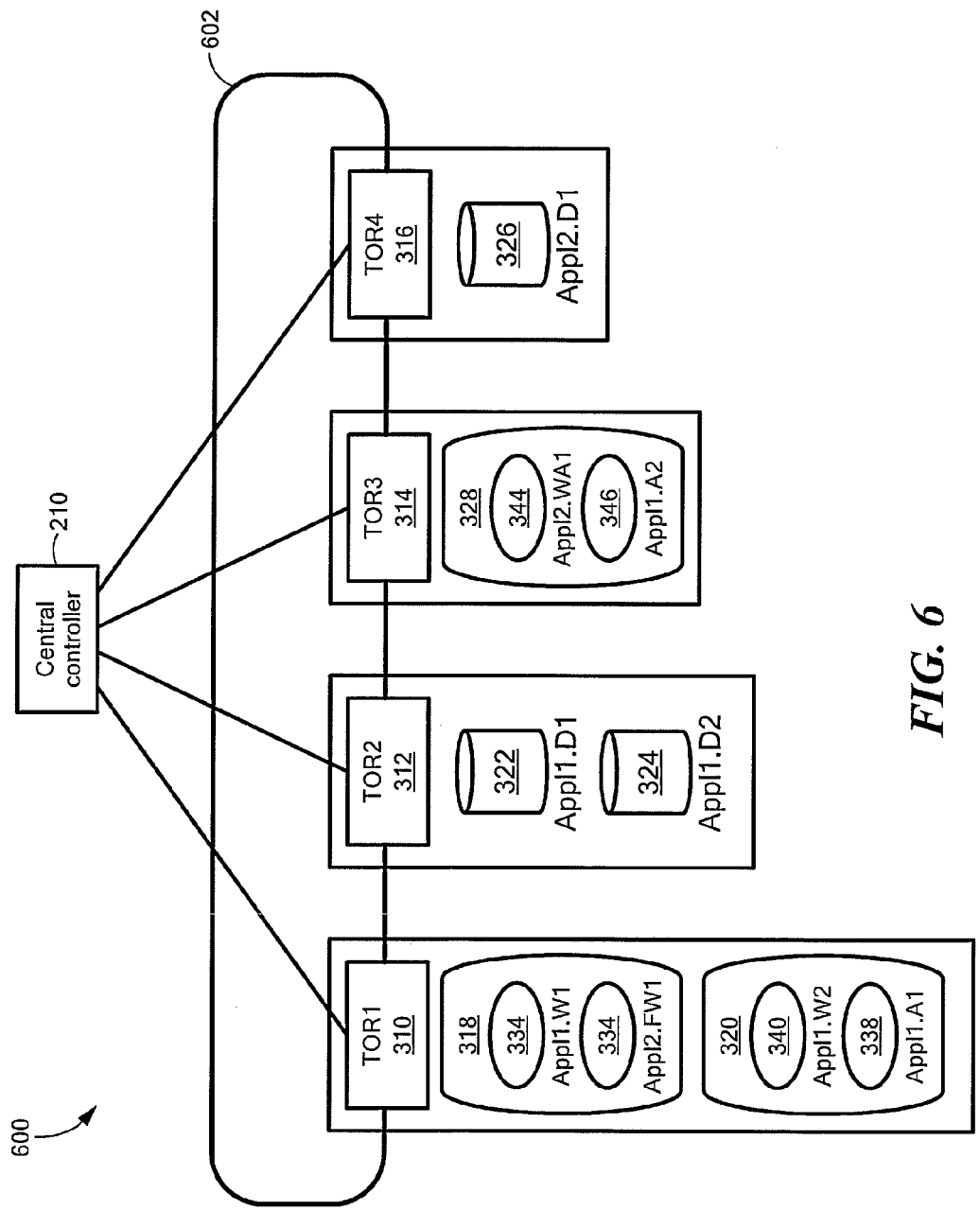
FIG. 6 is a block diagram of an exemplary data center network, illustrating exemplary implications of centralized control of nodes on the data center network having the network topology of FIG. 3.

As described above, the representative central controller 210 (see FIG. 2) can receive the information pertaining to the affinity-network topology from the affinity-network topology calculator 208, and, based at least on the received information, control one or more optical nodes, as well as zero, one, or more optical junction nodes, and modify a network topology, as appropriate, for implementing the affinity-network topology within a data center network, thereby providing enhanced application performance. FIG. 6 depicts an exemplary data center network 600 that illustrates exemplary implications of such centralized control of optical nodes by the central controller 210. As shown in FIG. 6, the aggregation servers 306, 308 previously included in the aggregation layer of the data center network 300 (see FIG. 3) can be effectively eliminated from the data center network 600 (see FIG. 6). In addition, the top-of-rack servers 310, 312, 314, 316 previously included in the access layer of the data center network 300 (see FIG. 3) are arranged on a logical ring network 602 within the data center network 600 (see FIG. 6). For example, the logical ring network 602 can be implemented as a logical optical ring network. Further, the top-of-rack server 310 (and its associated VMs 318, 320), the top-of-rack server 312 (and its associated data stores 322, 324), the top-of-rack server 314 (and its associated VM 328), and the top-of-rack server 316 (and its associated data store 326), can each be implemented as an optical node on the logical optical ring network.

Figure 7:
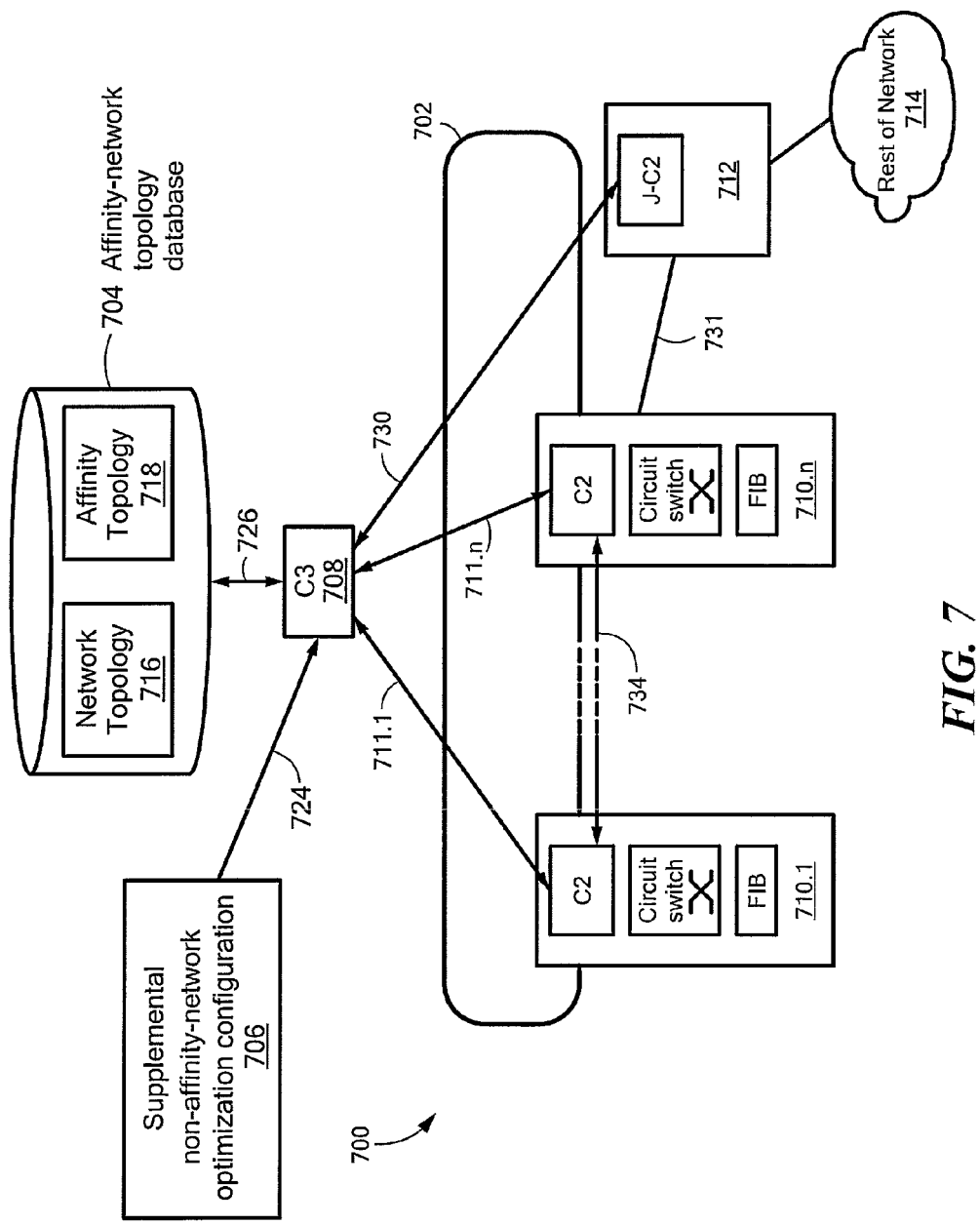
FIG. 7 is a block diagram of another exemplary data center network, illustrating exemplary implications of centralized control of nodes on the data center network.

FIG. 7 depicts another exemplary data center network 700, illustrating exemplary implications of centralized control of a plurality of optical nodes 710.1-710.$n$, as well as an optical junction node 712, by a central controller (C3) 708. As shown in FIG. 7, the central controller (C3) 708 can receive information pertaining to the affinity-network topology from an affinity-network topology database 704 over a controller interface 726. The central controller (C3) 708 can also receive information pertaining to a supplemental non-affinity-network configuration 706 over a controller interface 724. For example, a governing central controller (C4) may be the source of such information pertaining to the supplemental non-affinity-network configuration. Such a supplemental non-affinity-network configuration can correspond to network operation preferences that are specified separately from the affinity topology, such as, for a set of specific links, keeping the link utilization below a given threshold, prioritizing specific network traffic (e.g., data packet or frame) flows according to a time schedule, etc.

As further shown in FIG. 7, the optical nodes 710.1-710.$n$ are arranged on a logical optical ring network 702. Each of the optical nodes 710.1-710.$n$ includes a co-resident controller (C2) communicably coupled to the central controller (C3) 708, which, for example, can provide functionality like that provided by the central controllers (C3) 108, 110, 112 (see FIG. 1). Each of the optical nodes 710.1-710.$n$ can further include a switch (e.g., a packet switch, a packet switch and a cross-point switch, or a packet switch and a cross-bar switch), and a forwarding information base (FIB). Specifically, the co-resident controllers (C2) associated with the optical nodes 710.1-710.$n$ are communicably coupled to the central controller (C3) 708 by controller interfaces 711.1-711.$n$, respectively. Similarly, the optical junction node 712 is communicably coupled to the central controller (C3) 708 by a controller interface 730. For example, the optical nodes 710.1-710.$n$ can have layer-2 or layer-3 connectivity to the central controller (C3) 708. Further, each of the optical nodes can employ in-band management through a switch fabric, or out-of-band management. The optical junction node 712 can be managed in-band or out-of-band.

In addition, each of the co-resident controllers (C2) associated with the respective optical nodes 710.1-710.$n$ (see FIG. 7) is communicably coupled to one or more adjacent co-resident controllers (C2) on the optical ring network 702 by a common control channel, namely, a supervisor channel 734, without mixing any control traffic with the data plane. For example, the co-resident controllers (C2) can employ the supervisor channel 734 to perform at least the following exemplary tasks: (1) detect incorrect wiring and/or fiber connections (e.g., "east-to-east" instead of "east-to-west"); (2) assist in locating physical wiring and/or fiber breaks; (3) learn the topology of the optical nodes 710.1-710.$n$ on the optical ring network 702 (e.g., the co-resident controllers (C2) can exchange neighbor-to-neighbor connectivity information, allowing the co-resident controllers (C2) to build the topology of the supervisor channel 734, or a partial segment thereof, and, by inference, the topology of the optical nodes 710.1-710.$n$ on the optical ring network 702); (4) determine the placement of what is referred to herein as a "logical break" (e.g., the co-resident controllers (C2) can determine the placement of the logical break, and move the logical break, if necessary—such a logical break, as further described below, is typically adjacent to the last known physical break in the fiber of the optical ring network 702); (5) propagate real-time optical ring network connect and/or disconnect notifications; (6) learn MAC address/IP address entries (e.g., the co-resident controllers (C2) can learn all of the MAC addresses/IP addresses that represent host computers (the "hosts"; for example, servers and/or any other suitable network equipment) attached to the access ports of the optical nodes 710.1-710.$n$, and announce the MAC addresses/IP addresses to the other co-resident controllers (C2) so that they can determine how each MAC address/IP address can be reached); (7) remove or update MAC address/IP address entries; and (8) propagate shared configuration information.

The data center network 700 (see FIG. 7) further includes the optical junction node 712 for interconnecting the network 700 with the rest of the network 714. The optical junction node 712 can have an associated co-resident controller (also referred to herein as "J-C2"). The optical junction node 712 is communicably coupleable to at least one of the optical nodes 710.1-710.$n$ on the optical ring network 702, such as the optical node 710.$n$. The optical junction node 712 is also communicably coupleable to one or more other nodes in the rest of the network 714. As shown in FIG. 7, the co-resident controller J-C2 is communicably coupled to the central controller (C3) 708 via a controller interface 730, and further communicably coupled to the co-resident controller (C2) associated with the optical node 710.$n$ via a controller interface 731. In the data center network 700, the central controller (C3) 708 can provide instructions to the co-resident controllers (C2) associated with the respective optical nodes 710.1-710.$n$, as well as the co-resident controller (J-C2) associated with the optical junction node 712, based at least on one or more requirements and/or constraints pertaining to the affinity-network topology, and/or one or more applications to be run on at least the optical ring network 702. Further, each co-resident controller (C2, J-C2) can support the central controller (C3) 708 by providing processing capabilities for one or more functions that can be performed in a de-centralized manner. The respective co-resident controllers (C2, J-C2) can operate independently of one another, and/or in concert, to maintain the operation of at least the optical ring network 702.

It is noted that a data center network architecture, such as one that includes the data center network 700, may include zero, one, or more optical junction nodes, such as the optical junction node 712. It is further noted that the optical nodes 710.1-710.n deployed on the logical optical ring network 702 can be connected to neighboring nodes through uplink ports, while the remaining ports on the optical nodes 710.1-710.n can be used as access ports for interconnection to ports on other optical nodes, servers, and/or any other suitable network equipment.

Such optical nodes can forward frames over a network (such as the data center network 700; see FIG. 7) via network segments constructed with hardware/software including, but not limited to, connectors, cables, optical fibers, hardware transceivers, cross-points, cross-bars, PHYs, MACs, TCAMS, switch fabrics, and provisioned with, for example, cross-point/cross-bar settings, link aggregation groups, VLANs (virtual local area networks), IP (Internet Protocol) interfaces, and virtual routers. In the aggregate, these hardware and software aspects can be modeled as abstract components (also referred to herein as the "resource model"), each with specific capabilities, configuration, state, and connectivity (e.g., hardwired signal paths or software layering hierarchy). A co-resident controller (C2) associated with an optical node can define such a resource model for each supported hardware platform in any suitable representation (e.g., structured text such as XML or JSON, or binary objects for a given programming language). The co-resident controller (C2) can provide this resource model to the central controller (C3) to allow it to understand the capabilities, configuration, state, and connectivity of all of the available network segments in a particular node, and all inter-connected nodes in the aggregate. In addition, the co-resident controller (C2) can pre-define a number of operations to be performed on some or all of these components to control the optical node, for example, by inserting it into the network, or isolating its ports from the network. The central controller (C3) can compute the desired topology for the network segments, provide the configuration for the respective components of one or more optical nodes, and instruct the co-resident controller (C2) to make requested changes within the scope of a transaction. The co-resident controller (C2) can either validate the requested changes to the resource model and enact them upon a transaction commit, or otherwise abort the transaction.

In addition, the central controller (C3) can provide one or more forwarding topologies with accompanying constraints to the optical nodes that, once accepted, will be retained until the central controller (C3) removes them. The co-resident controller (C2) can autonomously and deterministically apply or remove these forwarding topologies to/from the hardware and software components of its associated optical node based on the availability of the required network segments, thereby arriving at a consistent end-to-end forwarding configuration for the network as a function of the current network state. As employed herein, each forwarding topology identifies the set of network segments to be used, and the accompanying constraints define one or more datagrams to which the forwarding topology applies to achieve the end-to-end forwarding configuration.

The set of network segments for a given forwarding topology can be expressed as a list of interconnects, each having a start point and an endpoint connecting known layer-2 entities. The optical nodes cooperate to monitor the layer-2 link state and endpoint information, and, if any interconnect is modified to span different endpoints (e.g., when layer-1 connectivity is changed) or cannot transport frames (e.g., due to transceiver failure or other cause for bringing a link down), all optical nodes on the network will mark the affected interconnect(s), as well as all forwarding topologies that use them, as invalid. Affected datagrams may then be sent over one or more other existing forwarding topologies, or newly applied backup (alternative) forwarding topologies. The co-resident controller (C2) can use the supervisor channel (such as the supervisor channel 734) to exchange and synchronize information on the state of interconnects, and all optical nodes can use a suitable deterministic algorithm to select the same forwarding topologies. It is noted that the accompanying constraints for a given forwarding topology can be applied by matching datagrams in particular hardware and/or software components, as defined by the resource model. For example, the constraints accompanying a given forwarding topology may match fields such as the MAC address, VLAN, and/or IP subnet, arriving on a particular ingress port to the switch fabric before they are considered qualified to use a particular forwarding topology.

In the data center network 700 (see FIG. 7), each of the optical nodes 710.1-710.n can perform an orderly transition through a plurality of successive operational stages, namely, operational stage zero ("S0"), operational stage one ("S1"), operational stage two ("S2"), and operational stage three ("S3"). Operational stage S0 corresponds to an optical node that is powered-off. Operational stage S1 corresponds to an optical node that is "self-aware", but isolated from the uplinks of the optical node as well as the supervisor channel 734. Such an optical node operating in operational stage S1 does not communicate with co-resident controllers (C2) associated with any other optical nodes, nor does it communicate with the central controller (C3) 708. In operational stage S2, an optical node is not only self-aware, but also "peer-aware". Such an optical node operating in operational stage S2 can communicate with co-resident controllers (C2) associated with other optical nodes over the supervisor channel 734, exchanging network traffic between one or more of the uplink ports and/or the access ports of the respective optical nodes, but does not communicate with the central controller (C3) 708. In operational stage S3, an optical node can communicate with the co-resident controllers (C2) associated with the other optical nodes over the supervisor channel 734, and with the central controller (C3) 708. The operational stages S1, S2, S3 of an optical node are further described below.

An optical node (such as one of the optical nodes 710.1-710.n; see FIG. 7) can enter operational stage S1 when the optical node is first powered-on or rebooted. In operational stage S1, the optical node is transparent to, and isolated from, the links connected to the uplink ports of the optical node, while interconnectivity is provided among the links connected to the access ports. Further, in operational stage S1, one or more self-tests can be performed on the optical node, as desired and/or required, to determine whether or not the optical node is operational. It is noted that, in operational stage S1, an optical node is prohibited from exchanging network traffic with the links connected to its uplink ports, but is allowed to perform bidirectional pass-through with regard to such network traffic, and/or control traffic on the supervisor channel (such as the supervisor channel 734; see FIG. 7).

It is further noted that so-called "bridge loops" in the layer-2 broadcast domain can be avoided when an optical node is operating in its bidirectional pass-through mode by assuring that (1) all of the optical nodes on the network are operating in either operational stage S0 or S1, and are therefore prohibited from exchanging network traffic with the links connected to their uplink ports, or (2) at least one of the optical nodes on the network is operating in either operational stage S2 or S3, and therefore may have already established a logical break on a supervisor channel, and/or a flooding break on one or more outer rings of the network, to prevent the creation of such a bridge loop. For example, an optical node can place such a logical break on the supervisor channel 734 (see FIG. 7), and/or can place such a flooding break on one or more outer rings of the optical ring network 702 (see FIG. 7). Such outer rings generally correspond to a plurality of eastbound uplink ports (e.g., four (4) eastbound uplink ports, or any other suitable number of ports) and a plurality of westbound uplink ports (e.g., four (4) westbound uplink ports, or any other suitable number of ports) of an optical node. It is noted that a logical break can be placed on an optical ring network when it is fully connected, and can be co-located with the last known physical break in the fiber of the optical ring network.

For example, an optical node may place a logical break on the supervisor channel, and/or a flooding break on one or more of the outer rings of an optical ring network, by filtering network traffic in both directions on the eastbound uplink ports of the optical node. Specifically, when the optical node places the logical break on the supervisor channel, the optical node can filter the network traffic on its eastbound uplink ports to prohibit the propagation of all unicast, broadcast, and multicast data packets or frames except for a specified multicast data packet/frame (referred to herein as the "beacon frame"), which can be permitted to traverse the logical break to enable the network to determine whether or not the supervisor channel is faulty. Moreover, when the optical node places the flooding break on the outer rings, the optical node can filter the network traffic on its eastbound uplink ports to prohibit the flooding of all multi-destination data packets or frames, while permitting unicast data packets/frames having known destinations to traverse the flooding break. Such multi-destination data packets or frames are defined herein as broadcast data packets/frames, multicast data packets/frames, and unicast data packets/frames having unknown destinations. As a result, following the placement of such a flooding break, an optical node can still transmit unicast data packets/frames having known destinations in either direction around an optical ring network, and have the unicast data packets/frames successfully reach their respective destinations.

An optical node (such as one of the optical nodes 710.1-710.n; see FIG. 7) can enter operational stage S2 when its associated co-resident controller (C2) achieves connectivity to the links connected to the optical node's uplink ports. In operational stage S2, the co-resident controller (C2) can communicate with one or more other co-resident controllers (C2) associated with the other optical nodes on the network (such as the optical nodes 710.1-710.n on the optical ring network 702; see FIG. 7) over the supervisor channel (such as the supervisor channel 734; see FIG. 7), without mixing any control traffic with the data plane.

When an optical node enters operational stage S2 from operational stage S1, the co-resident controller (C2) associated with the optical node can employ the supervisor channel to exchange information with its peer co-resident controllers (C2) to determine (1) the topology of the optical network, or the topology of a partial segment of the optical network, and (2) the placement of a break (e.g., a logical break, a flooding break) on the optical network. The optical node can then exchange network traffic between the links connected to its access ports and uplink ports. It is noted that the co-resident controller (C2) associated with the optical node can avoid creating bridge loops by learning the placement of the break (e.g., a logical break, a flooding break) via the supervisor channel, and filtering network traffic in both directions on the eastbound uplink ports of the optical node, as required.

When an optical node enters operational stage S2 from operational stage S3 (e.g., communication between the optical node and the central controller (C3) may have been disrupted), all access ports and uplink ports of the optical node can remain operational. Moreover, in operational stage S2, an optical node can employ the supervisor channel to remain in synchronization with the other optical nodes on the optical network (or a partial segment of the optical network), until (1) the co-resident controller (C2) associated with the optical node is re-started, in which case the optical node reverts to operational stage S1, (2) the co-resident controller (C2) is considered to be non-responsive, and is therefore excluded from active participation on the supervisor channel (e.g., adjacent co-resident controllers (C2) may detect this condition, causing the central controller (C3) to regard the optical node as being inoperable; the optical node may eventually be re-started, in which case it will revert from operational stage S2 to operational stage S1), or (3) until a connection between the optical node and the central controller (C3) is established, causing a transition from operational stage S2 to operational stage S3.

It is noted that changing the placement of a logical break on a physical or logical optical ring network (e.g., in response to a fiber cut, or an optical node powering-off) can cause at least some endpoint addresses learned by the optical nodes to become out-of-date. For example, a MAC address learned on an eastbound port of an optical node may now be reachable through a westbound port of the optical node. In such a case, the co-resident controllers (C2) associated with the optical nodes on the optical ring network can cooperate to remove or re-point the MAC address entries when a logical break is either first placed on the optical ring network or subsequently changed, as conveyed over the supervisor channel. An optical node operating in operational stage S2 can provide connectivity between the links connected to its access ports and uplink ports via (1) any residual links that were previously configured by the central controller (C3) and are still operational, or (2) the outer rings. Moreover, such an optical node operating in operational stage S2 can recover from failures, for example, by tearing down any such residual links that are deemed to be inoperative, and/or by forwarding network traffic in an alternate direction on the outer rings.

An optical node (such as one of the optical nodes 710.1-710.n; see FIG. 7) can enter operational stage S3 once the optical node has successfully established a connection with the central controller (C3) (such as the central controller (C3) 708; see FIG. 7). If the optical node were to lose contact with the central controller (C3), then the optical node can revert from operational stage S3 to operational stage S2. It is noted that the address of the central controller (C3) 708 can be propagated through the supervisor channel 734 to allow all of the optical nodes 710.1-710.n on the optical ring network 702 to connect to the same central controller (C3) 708.

Figure 8:
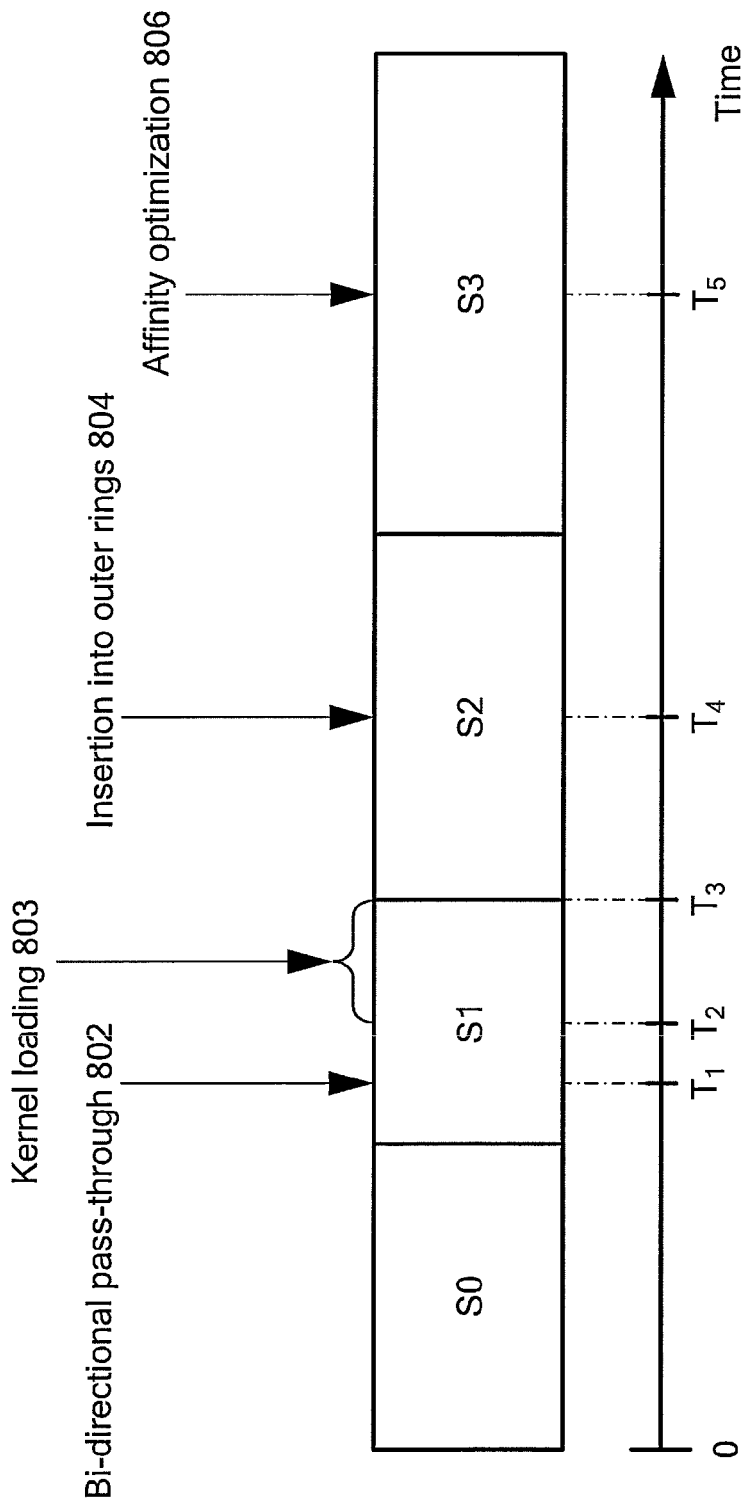
FIG. 8 is a diagram illustrating the timing of an exemplary sequence of events that can occur during a plurality of operational stages of the nodes of FIG. 7.

FIG. 8 is a diagram illustrating the timing of an exemplary sequence of events that can occur during the respective operational stages S0, S1, S2, S3 of an optical node (such as one of the optical nodes 710.1-710.n; see FIG. 7). When the optical node is operating in operational stage S0, the optical node is powered-off. When the optical node is operating in operational stage S1, the optical node can operate in the bidirectional pass-through mode 802 at, e.g., time $T_1$, and initialize kernel loading 803 of the co-resident controller (C2) associated with the optical node in an interval from, e.g., time $T_2$ to time $T_3$. When the optical node is operating in operational stage S2, the optical node can achieve interconnectivity with adjacent optical nodes on an optical ring network (such as the optical ring network 702; see FIG. 7), with control provided by the co-resident controllers (C2) associated with the respective optical nodes. Further, when operating in operational stage S2, the optical node can undergo insertion into the outer rings (see reference numeral 804; FIG. 8) of the optical ring network at, e.g., time $T_4$. When the optical node is operating in operational stage S3, the optical node can achieve interconnectivity with the adjacent optical nodes on the optical ring network and with a central controller (C3) (such as the central controller (C3) 708; see FIG. 7), allowing control to be provided by the respective co-resident controllers (C2) in conjunction with the central controller (C3). Further, when operating in operational stage S3, the optical node can participate in what is referred to herein as "affinity optimization" (see reference numeral 806; FIG. 8) at, e.g., time $T_5$, modifying and/or implementing the affinity-network topology across the optical ring network under the control of the co-resident controllers (C2) in conjunction with the central controller (C3).

As described above, in the data center network 700 (see FIG. 7), each of the optical nodes 710.1-710.n can perform an orderly transition through a plurality of operational stages, namely, operational stage S0, operational stage S1, operational stage S2, and operational stage S3. The operational stages S0, S1, S2, and S3 of an optical node are further described below with reference to a plurality of topology planes, namely, topology plane zero ("P0"), topology plane one ("P1"), topology plane two ("P2"), and topology plane three ("P3").

In normal operation, all of the optical nodes on a physical or logical optical ring network can eventually enter operational stage S3, establishing connectivity with a central controller (C3), which, in conjunction with co-resident controllers (C2) associated with the respective optical nodes, can configure the various links in the optical ring network for more efficient network traffic flow. In operational stage S3, the central controller (C3) can also determine what is referred to herein as a "topology graph" of the optical ring network.

Figure 9B:
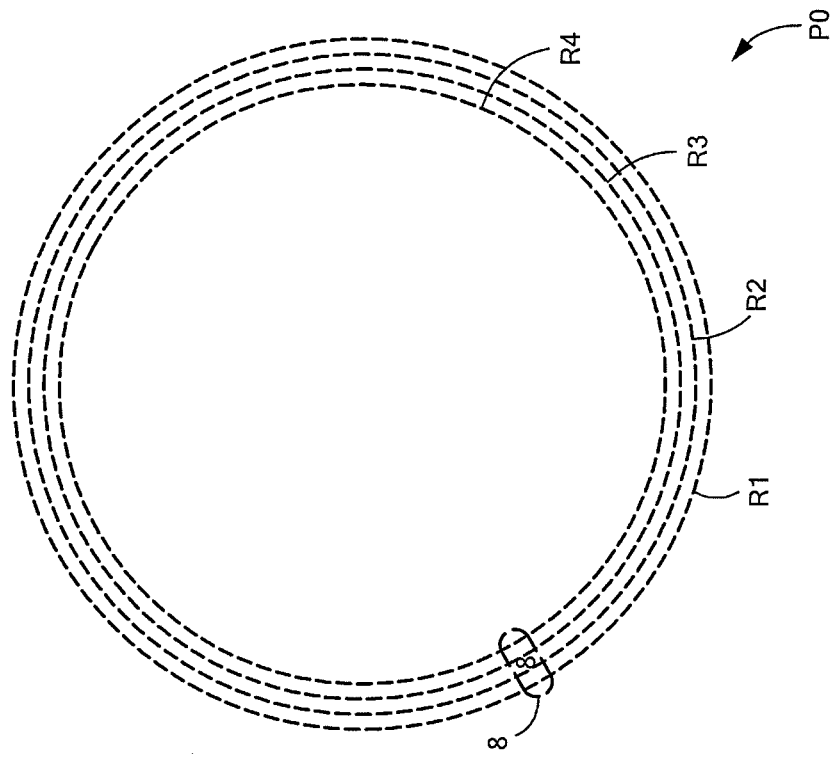
Figure 9A:
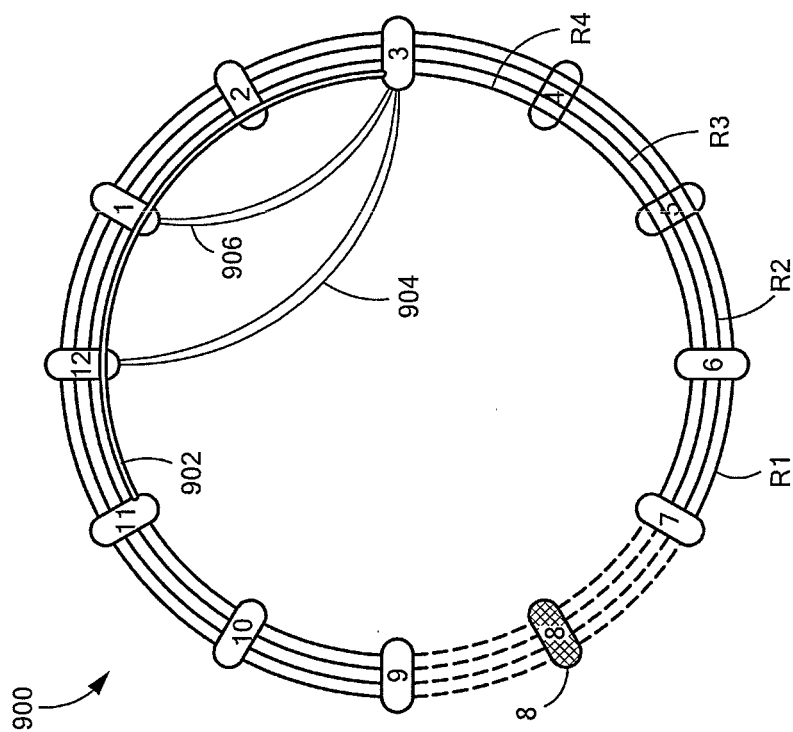
FIG. 9a is a diagram illustrating an exemplary topology graph of an exemplary physical or logical optical ring network.

FIG. 9a depicts a topology graph of an exemplary optical ring network 900, as determined by a central controller (C3). As shown in FIG. 9a, the optical ring network 900 includes a plurality of optical nodes 1-12, and a plurality of links (e.g., Ethernet spans) interconnecting the respective optical nodes 1-12. It is noted that the plurality of links interconnecting the optical nodes 1-12 can correspond to a plurality of outer rings R1, R2, R3, R4 (see FIG. 9a) of the optical ring network 900. The optical ring network 900 further includes a flyway 902 communicably coupled between the optical nodes 3 and 11 and passing through the optical nodes 1, 2, 12, a bypass link 904 communicably coupled between the optical nodes 3 and 12, and a bypass link 906 communicably coupled between the optical nodes 1 and 3. It is noted that such a flyway can be used to establish a point-to-point connection within an optical ring network between any two optical nodes that a corresponding channel plan allows, and can be implemented such that no signals are required to pass through a switch fabric for retransmission to the next optical node. Such a flyway and bypass links may be employed to achieve more efficient forwarding of network traffic on an optical ring network.

When a disruption occurs in the optical ring network 900 (see FIG. 9a), caused by, for example, one of the optical nodes 1-12 transitioning from one operational stage to another operational stage (e.g., due to an application program crash, a power failure, etc.), or a link interconnecting a pair of optical nodes becoming inoperative (e.g., due to a broken transceiver, an unplugged cable, etc.), the topology of the optical ring network 900 can be affected. Further, the central controller (C3) may or may not be capable of applying suitable modifications to the affected topology to address the disruption in a timely manner. As described above, in operational stages S2 and/or S3, the co-resident controllers (C2) associated with the respective optical nodes 1-12 can intervene to modify the topology, or, in operational stage S1, the co-resident controllers (C2) can control one or more of the optical nodes to operate in the bidirectional pass-through mode. Such topology modifications can be conceptually viewed as taking place in one or more of the topology planes P0, P1, P2, P3. It is noted that the exemplary topology graph illustrated in FIG. 9a is a superimposed depiction of topology plane P0 (see FIG. 9b), topology plane P1 (see FIG. 9c), and topology planes P2, P3 (see FIG. 9d).

FIG. 9b depicts the exemplary topology plane P0 within the optical ring network 900 (see FIG. 9a). As shown in FIG. 9b, topology plane P0 includes the optical node 8, which is powered-off and therefore operating in operational stage S0. Further, in topology plane P0, the outer rings R1, R2, R3, R4 are depicted as dashed lines because they do not contribute any network traffic, due to the optical node 8 being powered-off.

Figure 9D:
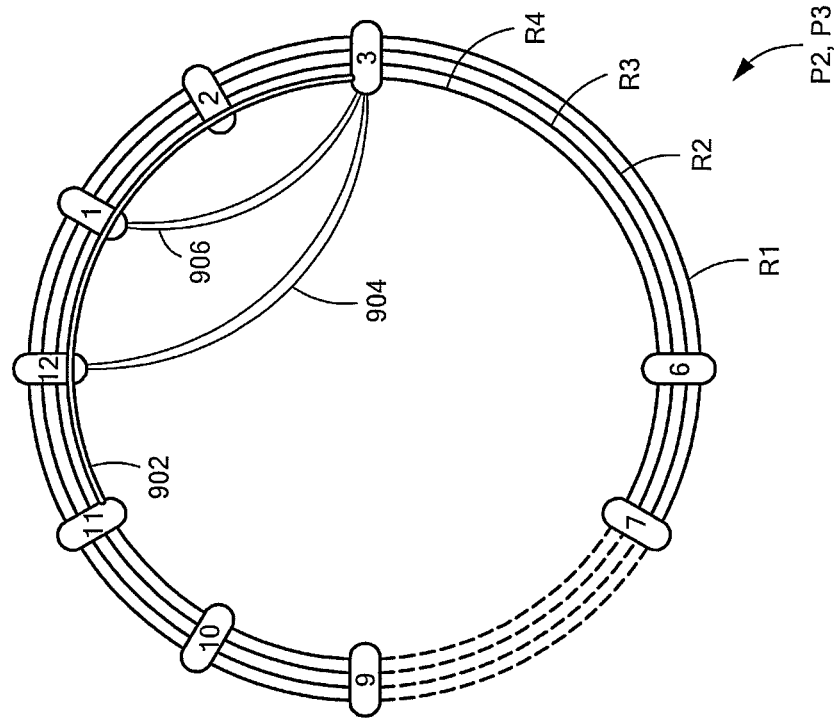
Figure 9C:
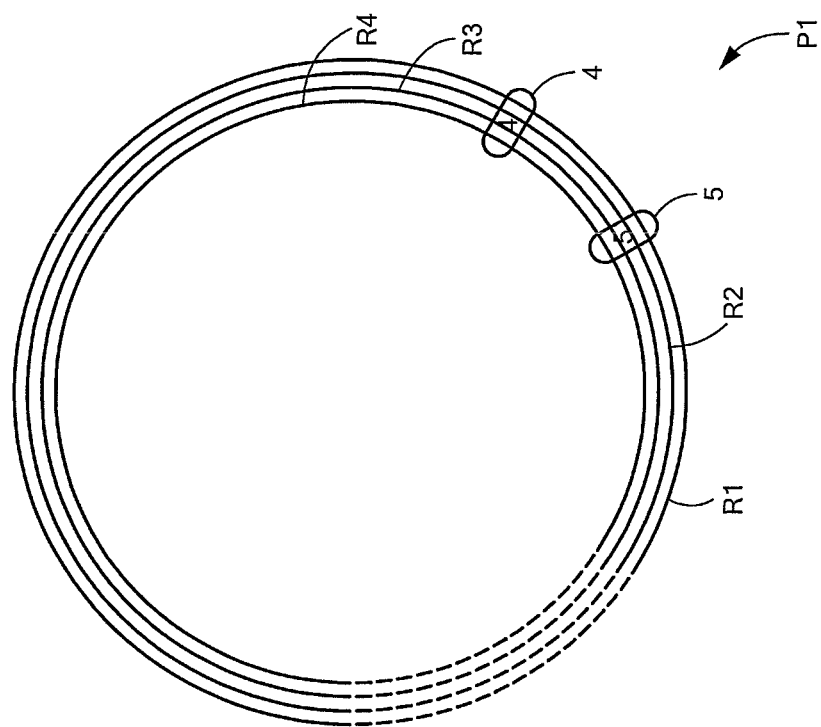

FIG. 9c depicts the exemplary topology plane P1 within the optical ring network 900 (see FIG. 9a). As shown in FIG. 9c, the topology plane P1 includes the optical nodes 4 and 5, which are operating in the bidirectional pass-through mode of operational stage S1. Further, in topology plane P1, the outer rings R1, R2, R3, R4 are depicted as solid lines, with the exception that the outer rings R1, R2, R3, R4 in the vicinity of the location of optical node 8 (see FIG. 9b) are depicted as dashed lines. The outer rings R1, R2, R3, R4 depicted as solid lines can carry network traffic because the optical nodes 4, 5 are operating in the bidirectional pass-through mode of operational stage S1. The outer rings R1, R2, R3, R4 depicted as dashed lines do not contribute network traffic because the optical node 8 is powered-off in operational stage S0.

FIG. 9d is a superimposed depiction of the exemplary topology planes P2, P3 within the optical ring network 900 (see FIG. 9a). As shown in FIG. 9d, the topology planes P2, P3 include the optical nodes 1-3, 6, 7, 9-12, each of which is operating in either operational stage S2 or operational stage S3. Further, in topology planes P2, P3, the outer rings R1, R2, R3, R4 are depicted as solid lines, with the exception that the outer rings R1, R2, R3, R4 in the vicinity of the location of optical node 8 (see FIG. 9b) are depicted as dashed lines, due to the optical node 8 being powered-off in operational stage S0. The outer rings R1, R2, R3, R4 depicted as solid lines can carry network traffic because the optical nodes 1-3, 6, 7, 9-12 are each operating in either operational stage S2 or operational stage S3. When an optical node (e.g., the optical node 10) is operating in operational stage S2, its contribution to topology plane P2 can include a connected eastbound link and a connected westbound link per outer ring R1, R2, R3, R4. It is noted that the selection of the outer rings available for use in topology plane P2 can be configurable. When an optical node enters operational stage S3 (e.g., the optical node 3), its contribution to topology plane P3 can be calculated by the central controller (C3), and can include a link for each configured flyway and/or bypass link, in addition to any remaining outer rings that are not part of topology plane P2.

For example, the outer rings R1, R2, R3, R4 can be divided between topology plane P2 and topology plane P3 to segregate the network traffic corresponding to the respective topology planes P2, P3. It is noted that, if a frame were allowed to cross over freely between topology planes P2 and P3, then unwanted bridge loops and/or replication may result. To address this problem, such a frame can be tagged when traveling over a particular topology plane; for example, the frame may be encapsulated when traveling over topology plane P2. Alternatively, topology planes P2 and P3 can be maintained as being physically separated. It is noted that frames may be allowed to cross over freely between topology planes P1 and P2. The topology planes P2 and P3 are further described below.

Topology plane P2 can be conceptually viewed as including (1) a first topology plane P2a, in which strict flooding (e.g., transmitting multi-destination frames in both the east and west directions along one or more of the outer rings in topology plane P2) can be applied until a logical break is reached, and (2) a second topology plane P2b, in which the co-resident controllers (C2) know the optical node where a destination MAC address is reachable, and can therefore transmit a unicast frame to the optical node using the shortest available logical path (e.g., clockwise or counterclockwise) along the outer rings in topology plane P2. While the FIB (e.g., the FIB included in each of the optical nodes 710.1-710.n; see FIG. 7) may or may not contain the proper forwarding information (e.g., the forwarding information may be out-of-date), the co-resident controllers (C2) associated with the optical nodes on an optical ring network can each maintain a first table, referred to herein as the "P2 table", which can be implemented as a non-volatile table memory for storing information pertaining to the MAC addresses, an associated virtual domain identifier (VDI) to represent the layer-2 broadcast domain, and the associated optical nodes and ports. When an optical node becomes aware that a new MAC address/VDI is attached to one or more of its access ports, the co-resident controller (C2) associated with the optical node can propagate information pertaining to the new MAC address/VDI over the supervisor channel to its peer co-resident controllers (C2) on the optical ring network. The P2 table plays a role in maintaining basic connectivity when an optical node is operating in operational stage S2.

The co-resident controllers (C2) associated with the respective optical nodes can each maintain a second table, referred to herein as the "P3 table", which can be implemented as a non-volatile table memory for storing information pertaining to topology and transfer configuration states for the optical node. Such topology and transfer configuration states can be determined by the central controller (C3), and can be used to populate a FIB (e.g., the FIB included in each of the optical nodes 710.1-710.n; see FIG. 7).

Figure 10A:
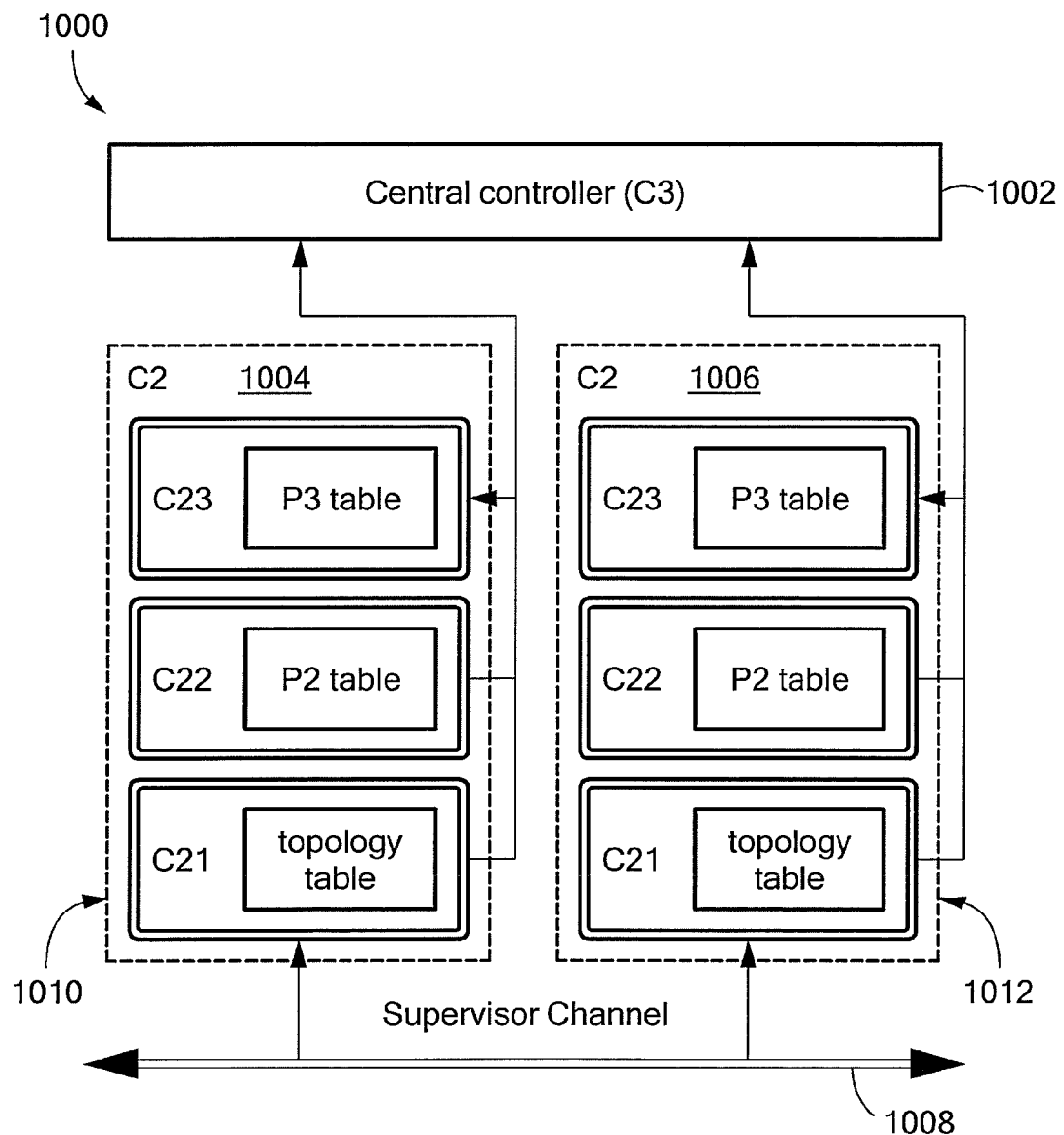
FIG. 10a is a block diagram of an exemplary central controller coupled to a plurality of exemplary local co-resident controllers within an exemplary physical or logical optical ring network.

FIG. 10a depicts a central controller (C3) 1002 communicably coupled to a plurality of co-resident controllers (C2) 1004, 1006 associated with a plurality of optical nodes 1010, 1012, respectively, on a physical or logical optical ring network 1000. As shown in FIG. 10a, the co-resident controllers (C2) 1004, 1006 can each communicate with one another over a supervisor channel 1008. Further, each co-resident controller (C2) 1004, 1006 includes a plurality of logical modules, namely, a logical module C21 containing a topology table, a logical module C22 containing a P2 table, and a logical module C23 containing a P3 table.

Each co-resident controller (C2) (e.g., the co-resident controller (C2) 1004 or 1006; see FIG. 10a) can enter what is referred to herein as a "cold startup mode" or a "warm startup mode". When a co-resident controller (C2) enters the cold startup mode, the co-resident controller (C2) can clear the topology table (e.g., a topology table memory) within the logical module C21, and re-learn the topology table through communication with its peer co-resident controllers (C2) over the supervisor channel (e.g., the supervisor channel 1008; see FIG. 10a). For example, when an optical node is first booted, its associated co-resident controller (C2) can enter the cold startup mode, in which the co-resident controller (C2) can re-initialize the hardware and/or software structures under its control. Further, the co-resident controller (C2) can re-learn the topology of the optical nodes on the optical ring network by exchanging neighbor-to-neighbor connectivity information over the supervisor channel, and store the learned topology information in its associated topology table.

As shown in FIG. 10a, the co-resident controller (C2) (e.g., the co-resident controller (C2) 1004 or 1006) maintains the P2 table in the logical module C22. The P2 table contains all of the MAC addresses that the co-resident controller (C2) has learned locally and/or from its peer co-resident controllers (C2). For example, the peer co-resident controllers (C2) can announce, via the supervisor channel, the MAC addresses learned via their respective access ports. Each co-resident controller (C2) can use the P2 table to determine how best to reach a given MAC address, taking into account the possible placement of a logical break. It is noted that the P2 table is independent of the MAC address table embedded in the FIB.

When a co-resident controller (C2) (e.g., the co-resident controller (C2) 1004 or 1006; see FIG. 10a) enters the cold startup mode, the co-resident controller (C2) can clear the P2 table, and re-initialize the MAC address table in the FIB. The co-resident controller (C2) can also re-learn the MAC addresses locally, and communicate with all of the other co-resident controllers (C2) on the optical ring network to reacquire their local MAC address information. When a co-resident controller (C2) enters the warm startup mode, the co-resident controller (C2) can audit the P2 table against the MAC address table in the FIB so that all of the MAC addresses are known in the P2 table. The co-resident controller (C2) can also audit the P2 table against the MAC address tables of its peer co-resident controllers (C2) to assure that there are no out-of-date or missing entries in the P2 table. For example, when the co-resident controller (C2) is re-started (e.g., after an application program crash), the co-resident controller (C2) associated therewith can enter the warm startup mode, unless consecutive failure/error conditions have incurred, in which case the co-resident controller (C2) can be forced to enter the cold startup mode. In the warm startup mode, the co-resident controller (C2) can leave the hardware and/or software structures under its control intact, but can audit them to assure mutual consistency.

As shown in FIG. 10a, the co-resident controller (C2) (e.g., the co-resident controller (C2) 1004 or 1006) maintains the P3 table in the logical module C23. The P3 table can store information pertaining to the local configuration of topology plane P3, as well as any flyway and/or bypass links together with failure conditions for removing such flyway and bypass links. The co-resident controller (C2) can receive the information contained in the P3 table from the central controller (C3) (e.g., the central controller (C3) 1002).

When the co-resident controller (C2) 1004 or 1006 enters the cold startup mode, the co-resident controller (C2) can clear the P3 table, and reestablish its connection to the central controller (C3) 1002. Once the co-resident controller (C2)

1004 or 1006 connects to the central controller (C3) 1002 in operational stage S3, the central controller (C3) 1002 can audit the P3 table, and take any corrective actions, if necessary. When the co-resident controller (C2) 1004 or 1006 enters the warm startup mode, the co-resident controller (C2) can initiate an audit of the P3 table against the information contained in the FIB to assure that (1) all failure conditions specified in the P3 table have been handled, and (2) there are no entries in the FIB that are inconsistent with the P3 table. Once the central controller (C3) 1002 reconnects to the co-resident controller (C2) 1004 or 1006, the central controller (C3) 1002 can audit the P3 table, and take any corrective actions, if necessary (e.g., the P3 table may be modified or cleared).

It is noted that when the forwarding rules for the FIB (e.g., the FIB included in each of the optical nodes 710.1-710.n; see FIG. 7) are unable to handle the forwarding of a data packet due to, e.g., a missing entry in the MAC address table, the co-resident controller (C2) can search the P3 table for the appropriate forwarding information for the packet, and, if necessary, can search the P2 table for such forwarding information. In this way, the central controller (C3) can effectively overrule topology plane P2 installed by the co-resident controller (C2), using topology plane P3 computed by the central controller (C3). Moreover, if an entry or entries were removed from the P2 table and/or the P3 table, then the co-resident controller (C2) can search the FIB to assure that it does not contain any forwarding rules based on out-of-date information in the P2 and/or P3 tables. It is noted that a forwarding topology in topology plane P2 (the "P2 forwarding topology") corresponds to a set of network segments, and is managed by the co-resident controllers (C2). Further, a forwarding topology in topology plane P3 (the "P3 forwarding topology") also corresponds to a set of network segments, and is managed by the central controller (C3).

An exemplary method of operating an optical node having an associated co-resident controller (C2) (such as the co-resident controller (C2) 1004 or 1006; see FIGS. 10a, 10b), an associated P2 table, and an associated P3 table, is described below with reference to FIG. 11. As depicted in step 1102, an incoming data packet belonging to a specified packet flow, and having a specified destination (e.g., a destination MAC address), is received at an input port of the optical node. As depicted in step 1104, a determination is made as to whether or not the specified packet flow matches any entries containing appropriate forwarding information for the data packet in the P3 table. In the event the specified packet flow matches an entry in the P3 table, the data packet belonging to the specified packet flow is forwarded to an output port of the optical node, and the forwarding information from the P3 table is added to the forwarding information base (FIB), as depicted in step 1106. Otherwise, a determination is made as to whether or not the specified packet flow matches any entries containing the appropriate forwarding information for the data packet in the P2 table, as depicted in step 1108. In the event the specified packet flow matches an entry in the P2 table, the data packet belonging to the specified packet flow is forwarded to the output port of the optical node, and the forwarding information from the P2 table is added to the forwarding information base (FIB), as depicted in step 1110. Otherwise, an exception is generated, causing the co-resident controller (C2) to flood the data packet onto the network (e.g., onto topology plane P2) to discover the appropriate forwarding information for the data packet, or to buffer the data packet until such forwarding information is discovered, as depicted in step 1112. As depicted in step 1114, a determination is then made, by the co-resident controller (C2), as to whether or not the appropriate forwarding information for the data packet has been discovered. In the event the appropriate forwarding information for the data packet has been discovered, the P2 table and/or the P3 table is populated with the forwarding information by the co-resident controller (C2), as depicted in step 1116. Further, the data packet belonging to the specified packet flow is forwarded to the output port of the optical node, as depicted in step 1118. Otherwise, the co-resident controller (C2) is permitted to continue flooding data packets onto the network, as depicted in step 1120. It is noted that the forwarding information contained in the P3 table can include both the source MAC address and the destination MAC address for the incoming data packet, thereby allowing a path topology to be defined for the specified packet flow. Moreover, the forwarding information contained in the P2 table can include the destination MAC address for the incoming data packet, thereby allowing a tree topology to be defined for the specified packet flow.

In the data center network 100 (see FIG. 1), the central controllers (C3) 108, 110, 112, as well as the co-resident controllers (C2) associated with the optical ring networks A, B, C, and D, can function cooperatively to make (1) the configuration of the optical ring networks A, B, C, D effectively transparent, and (2) the operation of the respective optical ring networks A, B, C, D substantially automatic. The governing central controller (C4) 106 can coordinate operations between the multiple optical ring networks A, B. It is noted that such multiple optical ring networks can be cross-connected (e.g., see, in FIG. 1, cross-connecting links 114, 116 disposed between the optical ring networks A, B) by junction nodes (layer-1), direct cabling or bridges (layer-2), or routers (layer-3).

It is further noted that each of the optical ring networks A, B, C, D (see FIG. 1) can be identified by a ring ID, which can be implemented as a universally unique identifier (UUID), a globally unique identifier (GUID), or any other suitable identifier. Each of the optical ring networks A, B, C, D (see FIG. 1) can also be associated with a respective one of the central controllers (C3) 108, 110, 112 by specifying the address (the "C3 address") of the central controller (C3). Moreover, each of the central controllers (C3) 108, 110, 112 can manage one or more optical ring networks, using the ring ID to determine which optical ring network a given optical node belongs to. The operation of the central controller (C3), as well as the operation of the co-resident controllers (C2), are further described below. Assignment and propagation of ring IDs on an optical ring network are also described below.

Each central controller (C3) generally has the task of achieving more efficient network traffic flow on one or more optical ring networks associated therewith. Each central controller (C3) can also modify the network topology and implement the affinity-network topology within the optical ring network(s) associated therewith, for providing enhanced application performance. As employed herein, each central controller (C3) can perform at least the following tasks: (1) provision one or more ring IDs for one or more optical ring networks, respectively, if unknown to the co-resident controllers (C2) associated with the optical nodes on the optical ring networks (e.g., each optical ring network can have at most one ring ID associated with it); (2) learn the topology of the associated optical ring networks, and receive topology updates; (3) learn all of the MAC addresses on the local access links of the optical nodes on the associated optical ring networks, and receive updates on new and/or out-of-date MAC addresses; (4) obtain network traffic statistics for the optical nodes either in the aggregate (e.g., at the link load level) or by specific category (e.g., by VLAN), and/or by optical node port or forwarding rule; and (5) retrieve and update the P3 table to provision topology plane P3 with layer-1/layer-2/layer-3 forwarding rules.

In a data center network (such as the data center network 700; see FIG. 7), a system administrator can configure the address (the "C3 address") of a central controller (C3) (such as the central controller (C3) 708; see FIG. 7) on a single optical node (such as one of the optical nodes 710.1-710.$n$; see FIG. 7). Further, the co-resident controller (C2) associated with the optical node can connect to the central controller (C3), which can assign a ring ID to the optical node. The optical node can then propagate (e.g., "announce") the C3 address and the ring ID to the other optical nodes on an optical ring network (such as the optical ring network 702; see FIG. 7) over a supervisor channel (such as the supervisor channel 734; see FIG. 7). All of the optical nodes on the optical ring network can then use the C3 address to connect to the same central controller (C3), and identify themselves to the central controller (C3) using the ring ID. At some later time, the system administrator can configure the C3 address of a new central controller (C3) on one of the optical nodes within the optical ring network, causing the optical ring network to be switched over from a previous central controller (C3) to the new central controller (C3).

It is noted that the C3 address of a central controller (C3) can include non-volatile information stored on the respective optical nodes of a physical or logical optical ring network, and can therefore persist across one or more system reboots. Further, the ring ID can include volatile information stored on the respective optical nodes of the optical ring network, and can therefore be null on an optical node until such ring ID information is provided to its co-resident controller (C2). Such ring ID information can be provided to a co-resident controller (C2) by its peer co-resident controllers (C2) on the optical ring network (e.g., over the supervisor channel 734; see FIG. 7), or by the central controller (C3).

When the system administrator configures the C3 address of a new central controller (C3) on an optical node within a physical or logical optical ring network, the optical node can disconnect itself from the previous central controller (C3), if any, connect itself to the new central controller (C3), and present its currently assigned ring ID (which may be null) to the new central controller (C3), which can then validate or override the ring ID. If the new central controller (C3) validates the ring ID, then the optical node can propagate the C3 address of the new central controller (C3) and the validated ring ID to the other optical nodes on the optical ring network over the supervisor channel.

Once a co-resident controller (C2) on a physical or logical optical ring network has established a connection to a central controller (C3), the co-resident controller (C2) can provide connectivity information to the central controller (C3) to allow the central controller (C3) to determine the topology of the optical ring network. Such connectivity information can include, but is not limited to, one or more segment attributes, one or more node attributes, and/or one or more port attributes.

Such segment attributes can include at least the following: (1) a sorted list of active nodes in the order in which they appear on the supervisor channel (or a segment thereof) in the eastbound direction, in which each entry of the sorted list is a tuple containing the station MAC and IP addresses (the sorted list can end with the active node that currently controls a logical break, blocking its eastbound port; the sorted list does not include any active node(s) that have been excluded from the supervisor channel); and (2) a Boolean expression to indicate whether the optical ring network is fully connected or segmented.

Such node attributes can include at least the following: (1) the node type (e.g., junction or optical) and related information (e.g., chassis assembly/model, SKU, etc.); (2) the station MAC address (e.g. the primary MAC address); (3) the configured IP address for an out-of-band management interface; and (4) the configured IP address for the supervisor channel.

Such port attributes can include at least the following: (1) configuration capabilities, e.g., whether a programmable cross-point is present, media information (e.g., copper, wavelength, or set of available wavelengths), etc.; (2) configuration state, e.g., the MAC address of the port itself, whether the port is taken out of service, any cross-point setting (e.g., unknown, pass-through, inserted, multi-drop, test), which wavelength (or set thereof) is enabled, the layer-1 and layer-2 link status, etc.; and (3) configuration supplements, e.g., optional peer information such as the MAC address of the neighboring node on the other side of the link, and that neighboring node's station MAC address, all provided separately for the east and west directions, etc.

When any of the connectivity information changes, the co-resident controller (C2) can transmit to the central controller (C3) an asynchronous update that includes the attributes of the segment, node, and/or port that changed. The central controller (C3) can also retrieve the connectivity information from the co-resident controller (C2) should the need arise.

In addition, the central controller (C3) can retrieve information pertaining to all of the MAC addresses learned by the co-resident controller(s) (C2) as being present on its local access links. Such information can include the MAC address, the access port, and the layer-2 broadcast domain (e.g., as derived from the virtual domain identifier (VDI)). The co-resident controller(s) (C2) can transmit updates to the central controller (C3) if a MAC address becomes out-of-date, or is moved to a different access port on the same optical node.

It is noted that a central controller (C3) can obtain network traffic statistics on uplink ports and access ports, and/or forwarding statistics for dominant network traffic flows, e.g., by polling the co-resident controller(s) (C2) at a predetermined rate, such as once every few seconds. The central controller (C3) can also provide each co-resident controller (C2) with provisioning rules (e.g., configuration, forwarding, etc.). For example, a standard-compliant protocol, such as the Openflow Switching Protocol, may be employed to describe forwarding rules for the FIB (e.g., the FIB included in each of the optical nodes 710.1-710.$n$; see FIG. 7), and a predetermined non-standard-compliant protocol may be employed to provide configuration rules for configuring optical nodes to implement flyways and/or bypass links. Further, the central controller (C3) may configure multiple optical nodes within the scope of a transaction, so that failure to configure one optical node properly may result in the removal of the related configuration information at all of the optical nodes that were involved in the same transaction. In addition, by attaching boundary conditions (e.g., a link-down event) to the provisioning rules, the co-resident controller(s) (C2) can autonomously take corrective action on failure/error conditions. The central controller (C3) can instruct the co-resident controller(s) (C2) to provision one or more backup topologies for use in recovering from such failure/error conditions.

FIG. 10$b$ depicts another view of the physical or logical optical ring network 1000, in which the central controller (C3) 1002 is communicably coupled to the plurality of optical nodes 1010, 1012. As shown in FIG. 10$b$, the central controller (C3) 1002 includes a topology fitting engine 1018. Further, the optical node 1010 includes the co-resident controller (C2) 1004 and a packet/circuit switch 1019. Likewise, the optical node 1012 includes the co-resident controller (C2) 1006 and a packet/circuit switch 1021. The packet/circuit switches 1019, 1021 are operative to interconnect the respective optical nodes 1010, 1012 through their uplink ports over a plurality of communication channels (the "uplinks") 1009. In addition, the packet/circuit switch 1019 is operative to connect the optical node 1010 through its access ports to at least one host 1015 over at least one access link 1011. Similarly, the packet/circuit switch 1021 is operative to connect the optical node 1012 through its access ports to at least one host 1017 over at least one access link 1013.

Figure 10B:
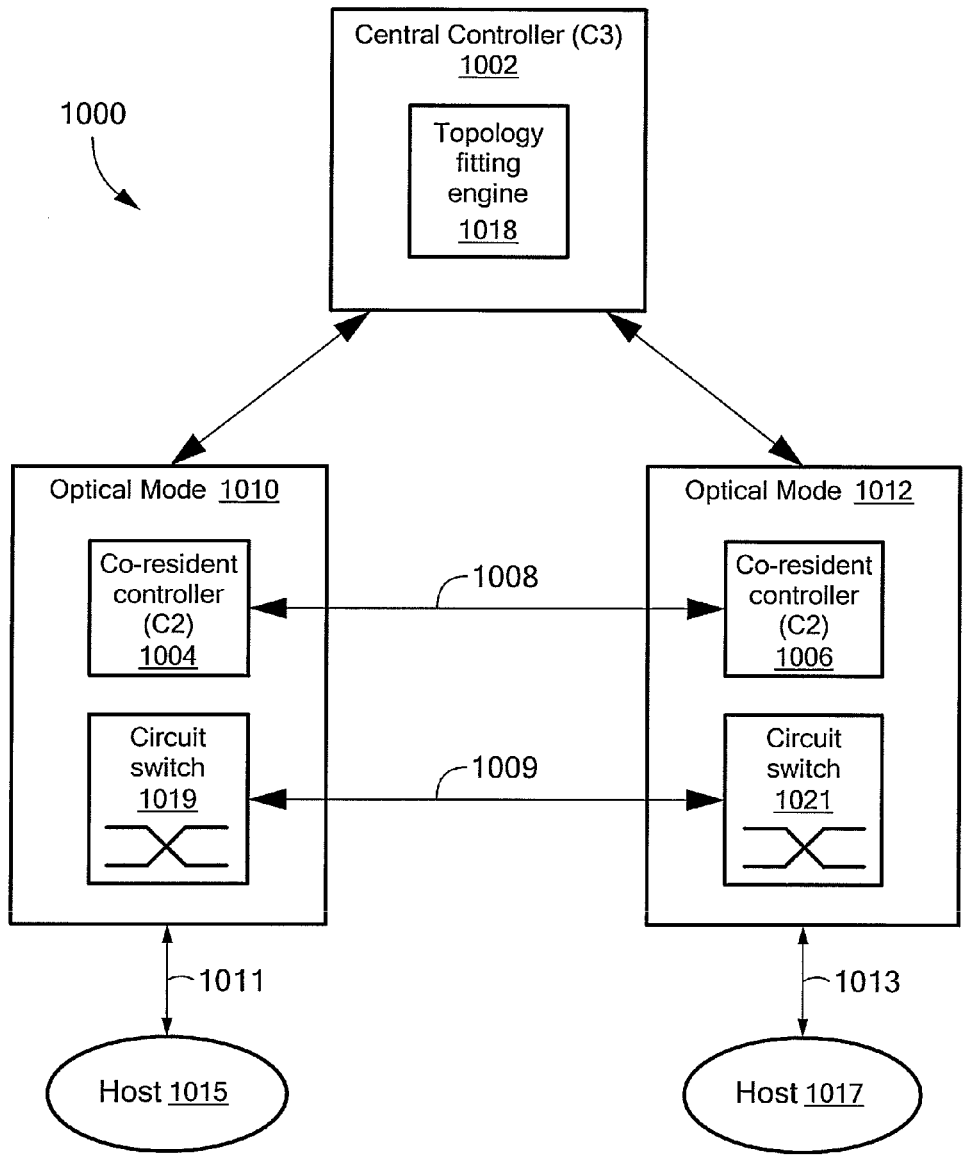
Figure 11:
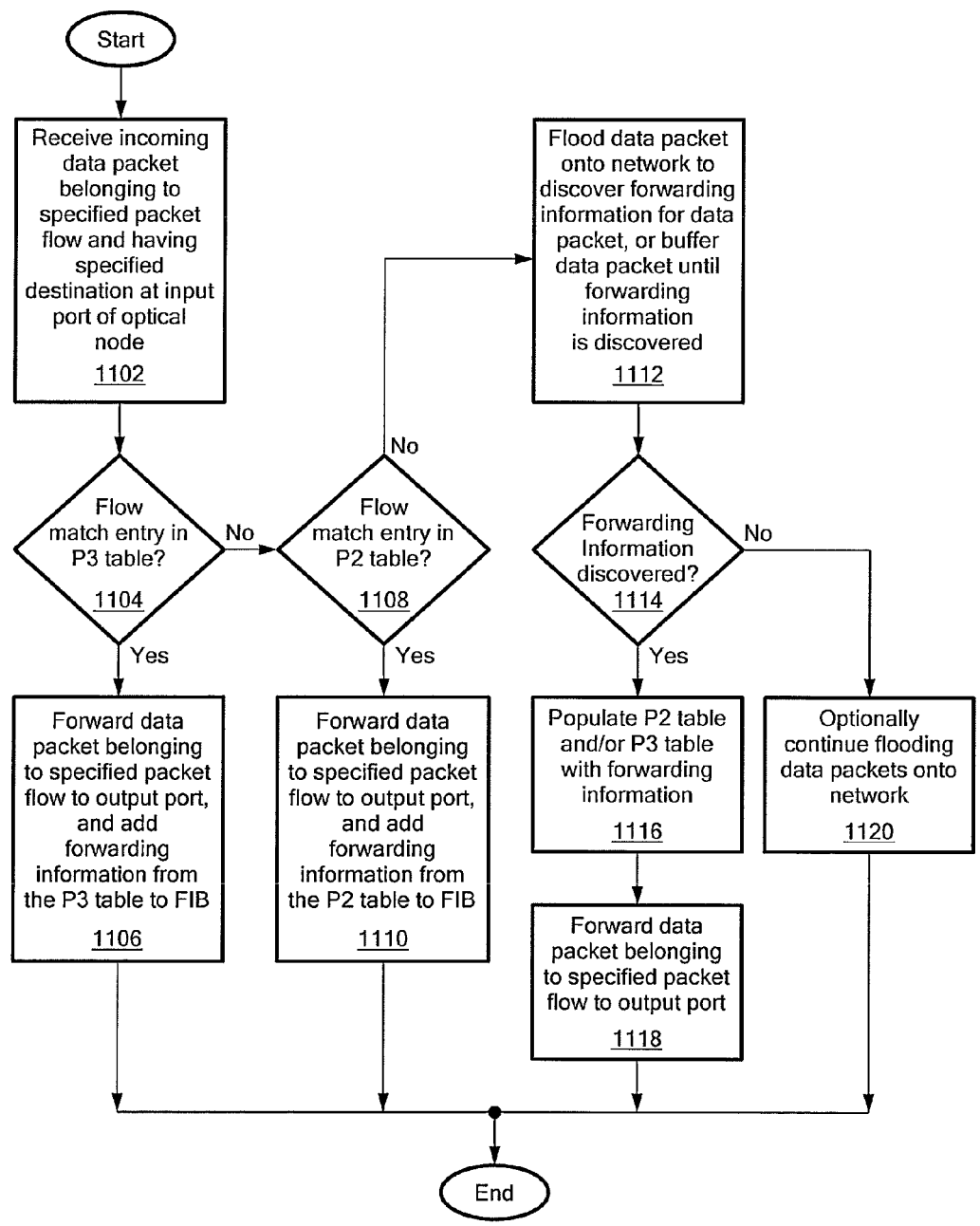
FIG. 11 is a flow diagram of an exemplary method of operating an optical node containing a co-resident controller.

As described above, the central controller (C3) (such as the central controller (C3) 1002; see FIGS. 10*a*, 10*b*) can modify the network topology and implement the affinity-network topology within the optical ring network(s) associated therewith, for providing enhanced application performance. In the optical ring network 1000 of FIGS. 10*a* and 10*b*, such modification of the network topology and implementation of the affinity-network topology can be achieved by the central controller (C3) 1002 using the topology fitting engine 1018.

As employed herein, the topology fitting engine 1018 within the central controller (C3) 1002 (see FIG. 10*b*) can receive, as inputs, the following information from the affinity-network topology database (such as the affinity-network topology database 704; see FIG. 7): the current network topology (e.g., circuit switch settings, wavelength settings, the layer-1 link status, the layer-2 link status, the MAC addresses of peer optical nodes on each uplink port (e.g., learned via the link layer discovery protocol (LLDP) or the supervisor channel), the learned MAC addresses on the access ports, the current configuration state of topology plane P3, and the current configuration state of topology plane P2), and the affinity topology (e.g., the affinity elements, the affinity groups, and the affinity links, including affinity link requirements and attributes). From the perspective of the topology fitting engine 1018, the affinity-network topology represents a workload abstraction layer. The topology fitting engine 1018 can use the workload abstraction layer to access the information pertaining to the affinity-network topology. The topology fitting engine 1018 can further receive, as inputs, the following information pertaining to the supplemental non-affinity-network configuration (such as the supplemental non-affinity-network configuration 706; see FIG. 7): various network statistics (e.g., the aggregate link-level statistics such as link utilization, byte counts, queue depths, etc., per-VLAN link-level statistics, per-source/destination MAC pair link-level statistics, and per granular flow level statistics), and circuit switch configuration capabilities (e.g., per-SKU switch list of transceiver and circuit switch capabilities and internal connectivity diagram).

In addition, the topology fitting engine 1018 can provide, as outputs, the following information: the settings for the circuit switch (e.g., the circuit switch 1019 or 1021; see FIG. 10*b*) within each optical node that can affect at least the underlying physical topology of topology plane P3, a list of candidate forwarding trees provisioned to each optical node as well as a mapping of each destination MAC address to a candidate forwarding tree (e.g., via a specific pinning, a hash function, or any other suitable function), and a list of candidate forwarding paths for each network traffic flow provisioned to optical nodes along those paths as well as a mapping of each network traffic flow to a candidate forwarding path (e.g., via a specific pinning, a hash function, or any other suitable function). The candidate forwarding trees and candidate forwarding paths can define the forwarding topologies that identify the network segments for forwarding traffic through the network. From the perspective of the optical nodes 1010, 1012, such forwarding topologies represent a network abstraction layer. Each co-resident controller (C2) 1004, 1006 associated with the respective optical nodes 1010, 1012 can use the network abstraction layer to access the information pertaining to the forwarding topologies.

Figure 12B:
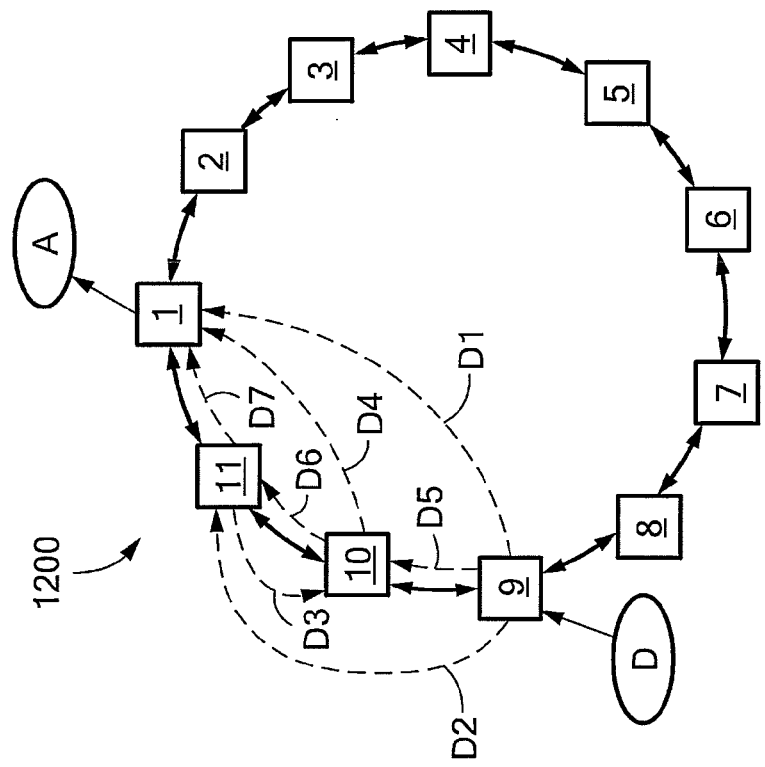
FIG. 12b is a block diagram of the optical ring network of FIG. 12a, including a plurality of exemplary candidate forwarding paths for forwarding network traffic flows from a host having a specified source address to another host having the specified destination address.
Figure 12A:
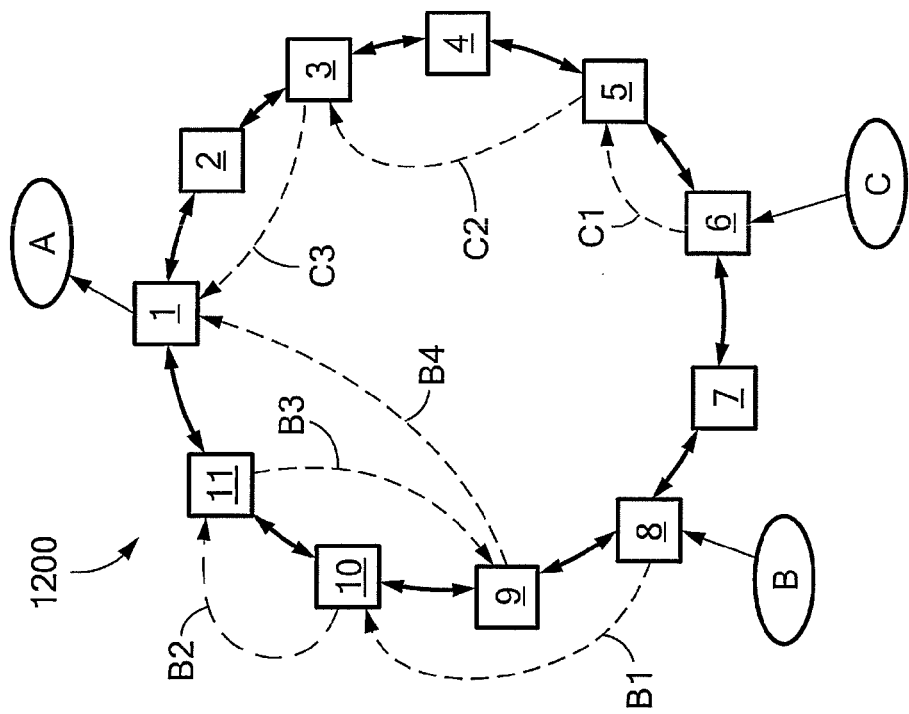
FIG. 12a is a block diagram of an exemplary physical or logical optical ring network including a plurality of exemplary optical nodes, and a plurality of exemplary candidate forwarding trees for forwarding network traffic flows to a host having a specified destination address.

FIG. 12*a* depicts an exemplary physical or logical optical ring network 1200 including a plurality of optical nodes 1-11, and a plurality of exemplary candidate forwarding trees for forwarding network traffic flows to a host A having a specified destination MAC address. The host A is communicably coupled to optical node 1 of the optical ring network 1200. Further, it is understood that optical nodes 1-11 are each communicably coupled to a central controller (C3). As shown in FIG. 12*a*, a first candidate forwarding tree can include a first tree segment B1 for effectively forwarding a traffic flow from optical node 8 to optical node 10, a second tree segment B2 for effectively forwarding the traffic flow from optical node 10 to optical node 11, a third tree segment B3 for effectively forwarding the traffic flow from optical node 11 to optical node 9, and a fourth tree segment B4 for effectively forwarding the traffic flow from optical node 9 to optical node 1. Using the first candidate forwarding tree having the tree segments B1, B2, B3, B4, a host B communicably coupled to optical node 8 can forward network traffic flows to the host A having the specified destination MAC address. As further shown in FIG. 12*a*, a second candidate forwarding tree can include a first tree segment C1 for effectively forwarding a traffic flow from optical node 6 to optical node 5, a second tree segment C2 for effectively forwarding the traffic flow from optical node 5 to optical node 3, and a third tree segment C3 for effectively forwarding the traffic flow from optical node 3 to optical node 1. Using the second candidate forwarding tree having the tree segments C1, C2, C3, a host C communicably coupled to optical node 6 can forward network traffic flows to the host A having the specified destination MAC address.

FIG. 12*b* depicts the exemplary optical ring network 1200 including the plurality of optical nodes 1-11, and a plurality of exemplary candidate forwarding paths for forwarding network traffic flows from a host D having a specified source MAC address to the host A having the specified destination MAC address. The host D is communicably coupled to optical node 9 of the optical ring network 1200. Again, it is understood that optical nodes 1-11 are each communicably coupled to a central controller (C3). As shown in FIG. 12*b*, a first candidate forwarding path can include a single path segment D1 for effectively forwarding a traffic flow from optical node 9 to optical node 1. Using the first candidate forwarding path having the single path segment D1, the host D having the specified source MAC address can forward network traffic flows to the host A having the specified destination MAC address. A second candidate forwarding path can include a path segment D2 for effectively forwarding a traffic flow from optical node 9 to optical node 11, a path segment D3 for effectively forwarding the traffic flow from optical node 11 to optical node 10, and a path segment D4 for effectively forwarding the traffic flow from optical node 10 to optical node 1. Using the second candidate forwarding path having the path segments D2, D3, D4, the host D having the specified source MAC address can forward network traffic flows to the host A having the specified destination MAC address. A third candidate forwarding path can include a path segment D5 for effectively forwarding a traffic flow from optical node 9 to optical node 10, a path segment D6 for effectively forwarding the traffic flow from optical node 10 to optical node 11, and a path segment D7 for effectively forwarding the traffic flow from optical node 11 to optical node 1. Using the third candidate forwarding path having the path segments D5, D6, D7, the host D having the specified source MAC address can forward network traffic flows to the host A having the specified destination MAC address.

As described above, when operating in operational stage S3, optical nodes can participate in affinity optimization, thereby modifying and/or implementing the affinity-network topology across a network under the control of their associated co-resident controllers (C2) in conjunction with a central controller (C3). As a result of such affinity optimization, the optical nodes can forward a network traffic flow (the "affinity flow") through the network along a path topology (e.g., along one of the candidate forwarding paths provided by the topology fitting engine 1018; see FIG. 10*b*), or along a tree topology (e.g., along one of the candidate forwarding trees provided by the topology fitting engine 1018; see FIG. 10*b*). So-called "non-affinity flows" can also be forwarded through the network such that certain network metrics are optimized (e.g., network links are load balanced subject to hop count considerations, etc.).

Such candidate forwarding paths and trees, along with appropriate mapping functions for each optical node, can define a general framework for achieving a desired data packet forwarding behavior. Such a general framework can provide for the aggregation of MAC addresses and affinity flows by having multiple addresses/flows map to a single candidate forwarding path or tree. Moreover, the lists of candidate forwarding paths and trees can provide a convenient way of granular load balancing by assuring that all of the optical nodes are provisioned with the same lists of candidate forwarding paths/trees, using a consistent mapping function (e.g., a hash function). In addition, the optical nodes can use the lists of candidate forwarding paths and trees to autonomously switch from active forwarding trees/paths to backup forwarding trees/paths, for example, by providing candidate forwarding paths and trees that utilize disjoint links.

Because there can be up to several hundreds of thousands, if not more, unique MAC addresses and affinity flows in a typical data center network, it may be problematic for a central controller (C3) (such as the central controller (C3) 1002; see FIGS. 10*a*, 10*b*) to provision candidate forwarding paths/trees for each destination MAC address or affinity flow in the network. To avoid having to provision such a potentially large number of candidate forwarding paths/trees to each optical node in the data center network, the central controller (C3) can define what is referred to herein as an "abstract endpoint" for each optical node communicably coupled thereto. Specifically, the central controller (C3) can map appropriate source/destination abstract endpoint pairs to the respective candidate forwarding paths, and further map appropriate destination abstract endpoints to the respective candidate forwarding trees, without having to directly map the numerous individual MAC addresses and network traffic flows.

As employed herein, each abstract endpoint can correspond to a specific node in a data center network. Further, the definition for each abstract endpoint (the "endpoint definition") can include a set of MAC addresses, a set of affinity flows, a set of tuples consisting of uplink/access ports and VLAN IDs, and a set of uplink/access ports. These various sets of addresses/flows/tuples/ports can, in turn, be mapped to individual MAC addresses and affinity flows. It is noted that such mappings can be known deterministically by the central controller (C3), as well as the respective nodes, because the MAC address attachments can be propagated among the nodes over the supervisor channel. The central controller (C3) can provide the respective endpoint definitions to the co-resident controllers (C2) communicably coupled thereto as part of the network abstraction layer.

As a result, each forwarding tree mapped to a given destination abstract endpoint can apply to all of the MAC addresses attached to the access ports of the corresponding node. Using the given destination abstract endpoint, the central controller (C3) can then provision a list of candidate forwarding trees for each corresponding destination MAC address. Similarly, each forwarding path mapped to a given source/destination abstract endpoint pair can apply to all of the MAC addresses attached to the access ports of the corresponding optical node pair. Using the given source/destination abstract endpoint pair, the central controller (C3) can then provision a list of candidate forwarding paths for each corresponding source/destination MAC address pair.

As described above, optical nodes on an optical ring network can use the lists of candidate forwarding paths and trees generated by the topology fitting engine (such as the topology fitting engine 1018; see FIG. 10*b*) to autonomously switch from an active forwarding path/tree to a backup forwarding path/tree. To that end, each list of candidate forwarding paths/trees can be divided into one or more active forwarding paths/trees, and one or more backup forwarding paths/trees, based on a specified weighting for each active and backup path/tree in the respective lists. For example, each active forwarding tree (as well as each active forwarding path) can have a specified weighting greater than zero ("0") or any other suitable value, and each backup forwarding tree (as well as each backup forwarding path) can have a specified weighting equal to 0 or any other suitable value. The specified weighting assigned to each active forwarding tree (and each active forwarding path) is indicative of the approximate proportion of individual forwarding trees (or paths) that get mapped to the corresponding abstract endpoint (e.g., a destination MAC address). Such a mapping can be accomplished using a hash function, or any other suitable mapping function. Further, the forwarding trees (and paths) that are mapped to a corresponding abstract endpoint can be ordered according to the order in which they become "active".

Figure 13A:
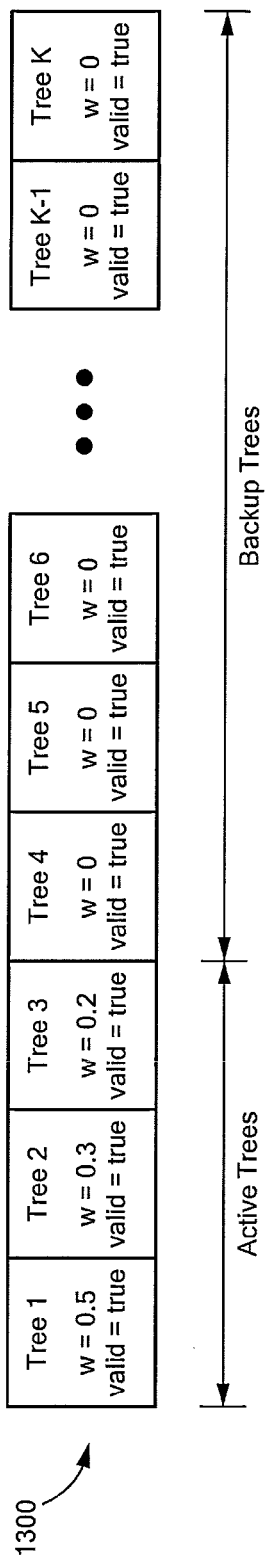
FIG. 13a is a diagram of a plurality of exemplary candidate forwarding trees that can be mapped to a predetermined abstract endpoint.

FIG. 13*a* depicts a list 1300 of exemplary candidate forwarding trees that can be mapped to a predetermined destination abstract endpoint. As shown in FIG. 13*a*, the plurality of candidate forwarding trees 1300 include a plurality of active forwarding trees 1-3 and a plurality of backup forwarding trees 4-K. Each active forwarding tree 1-3 has a specified weighting ("w") that is greater than 0 (e.g., w=0.5, 0.3, 0.2, respectively, or any other suitable weighting), and each backup forwarding tree 4-K has a specified weighting ("w") that is equal to 0. Further, each active forwarding tree 1-3, as well as each backup forwarding tree 4-K, has a corresponding validity value ("valid") designated as "true" or any other suitable designation. It is noted that such validity values can alternatively be designated as "false" or any other suitable designation. As employed herein, each active/backup forwarding tree (as well as each active/backup forwarding path) having a validity value designated as "true" provides the implication that no node on the forwarding tree (or path) is inoperable, and no link interconnecting any operable nodes on the forwarding tree (or path) is down. If any node on the forwarding tree (or path) is deemed to be inoperable, or if any link interconnecting any operable nodes on the forwarding tree (or path) is deemed to be down, then the validity value for that forwarding tree (or path) is designated as "false".

Figure 13B:
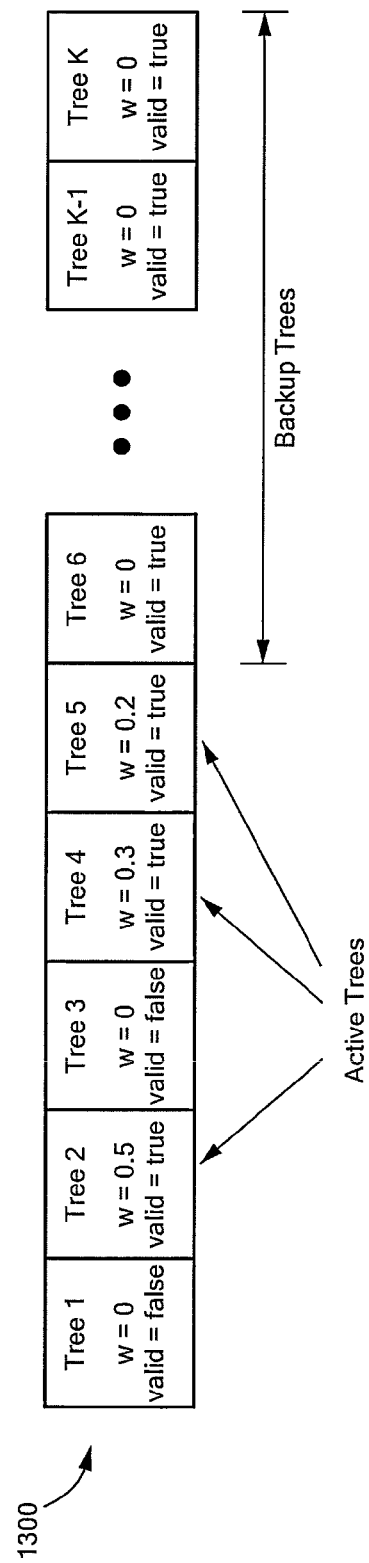
FIG. 13b is a diagram of the plurality of exemplary candidate forwarding trees of FIG. 14a, in which some active forwarding trees have been deemed to be invalid due to a node or link failure.

FIG. 13*b* depicts the list 1300 of exemplary candidate forwarding trees, in which some active forwarding trees have been deemed to be invalid ("valid=false") due to, for example, a node or link failure. As shown in FIG. 13b, the plurality of candidate forwarding trees 1300 now include a plurality of active forwarding trees 1-5 and a plurality of backup forwarding trees 6-K. Some of the active forwarding trees 1-5 (e.g., the active forwarding trees 2, 4, 5) have validity values ("valid") designated as "true", while other ones of the active forwarding trees 1-5 (e.g., the active forwarding trees 1, 3) have validity values designated as "false". As further shown in FIG. 13b, the backup forwarding trees 6-K each have a validity value designated as "true", and a specified weighting ("w") equal to 0. Moreover, the active forwarding trees 1, 3 with validity values designated as "false" have weightings specified to be equal to 0, while the active forwarding trees 2, 4, 5 with validity values designated as "true" have weightings specified to be greater than 0 (e.g., w=0.5, 0.3, 0.2, respectively). With reference to FIGS. 13a, 13b, it can be seen that the central controller (C3) may deterministically shift the specified weightings ("w") of the active forwarding trees in order as node/link failures occur, and thereby allow one or more of the backup forwarding trees to become "active". It is further noted that a renormalization of the specified weightings of the active forwarding trees may be required if the number of so-called valid active forwarding trees becomes less than the total number of active forwarding trees.

As described above, the central controller (C3) (such as the central controller (C3) 1002; see FIGS. 10a, 10b) can map appropriate source/destination abstract endpoint pairs to a plurality of candidate forwarding paths, and further map appropriate destination abstract endpoints to a plurality of candidate forwarding trees, without having to directly map numerous individual MAC addresses and network traffic flows. Given the source/destination abstract endpoint pairs for the respective candidate forwarding paths, and/or the destination abstract endpoints for the respective candidate forwarding trees, as well as at least the affinity topology and the network statistics including at least the link utilization, the topology fitting engine (such as the topology fitting engine 1018; see FIG. 10b) within the central controller (C3) can compute a list of candidate forwarding paths, and a list of candidate forwarding trees, suitable for a network of interest. It is noted that such computation of the lists of candidate forwarding paths/trees by the topology fitting engine is user configurable. For example, the topology fitting engine can be configured (e.g., by a user) to compute the lists of candidate forwarding paths/trees such that a predetermined cost function for the network is minimized. Such a cost function, "$\Delta_{tot}$", may be expressed as follows:

$$\Delta_{tot} = \Delta'_{res} + \frac{1}{|AL|} \sum_{(v,w) \in AL} \Delta(v, w), \quad (1)$$

in which "$\Delta'_{res}$" is expressed as $$\Delta'_{res} = \sum_{(l,m) \in E} F(\rho^e_{res}(l, m)) \quad (2)$$

where "E" is a set of network links, "(l,m)" is a member of the set of network links E, "$\rho_{res}^e(l,m)$" is the estimated residual link utilization for the network link (l,m), and "F( ... )" is a predetermined convex function whose $1^{st}$ and $2^{nd}$ derivatives exist everywhere; and, in which "$\Delta(v,w)$" is expressed as $$\Delta(v, w) = \beta_{vw} \frac{1}{Z} \sum_{z \in Z} \Delta_z(v, w), \quad (3)$$

where "(v,w)" is a member of a set of affinity links "AL", "$\beta_{vw}$" is a multiplicative factor representing the importance of satisfying the affinity link (v,w), "Z" is a set of affinity link attributes, and "z" is a member of the set of affinity link attributes Z. It is noted that the user may configure the topology fitting engine within the central controller (C3) to operate on any other suitable function(s) for computing the lists of candidate forwarding paths/trees.

It is noted that the operations depicted and/or described herein are purely exemplary. Further, the operations can be used in any sequence, as appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities can take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments can also relate to a device or an apparatus for performing such operations. The apparatus can be specially constructed for the required purpose, or can be a general-purpose computer selectively activated or configured by a computer program stored in the computer to perform the function of a particular machine. In particular, various general-purpose machines employing one or more processors coupled to one or more computer readable media can be used with computer programs written in accordance with the teachings disclosed herein, or it may be more convenient to construct a more specialized apparatus to perform the required operations.

Instructions for implementing the network architectures disclosed herein can also be embodied as computer readable code on a computer readable medium. The computer readable medium is any data storage device that can store data, which can thereafter be read by a computer system. Examples of such computer readable media include magnetic and solid state hard drives, read-only memory (ROM), random-access memory (RAM), Blu-ray™ disks, DVDs, CD-ROMs, CD-Rs, CD-RWs, magnetic tapes, and/or any other suitable optical or non-optical data storage device. The computer readable code can be stored in a single location, or stored in a distributed manner in a networked environment.

The foregoing description has been directed to particular illustrative embodiments of this disclosure. It will be apparent, however, that other variations and modifications may be made to the described embodiments, with the attainment of some or all of their associated advantages. Moreover, the procedures, processes, components, and/or modules described herein may be implemented in hardware, software, embodied as a computer-readable medium having program instructions, firmware, or a combination thereof. For example, the functions described herein may be performed by at least one processor executing program instructions out of at least one memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A controller for provisioning one or more forwarding topologies in a network having a plurality of nodes the controller comprising: at least one memory storing program instructions; and at least one processor operative to execute the program instructions to:
   receive information pertaining to an affinity topology, the affinity topology specifying affinity link attributes that describe policies and attributes for communications between a plurality of application components of the network along affinity links, wherein an affinity link represents a logical link between at least two application components within the network;
   compute one or more end-to-end forwarding topologies based at least in part on the affinity topology, each end-to-end forwarding topology identifying one or more network segments for configuring interconnections between the plurality of nodes for forwarding traffic through the network, wherein each end-to-end forwarding topology is defined by at least one candidate forwarding path, and a forwarding path identifies at least one network segment for forwarding traffic through the network;
   compute, for each path of the at least one candidate forwarding path in the one or more end-to-end forwarding topologies, an associated cost based at least in part on whether the path satisfies affinity link attributes in the affinity topology, and
   provide the one or more end-to-end forwarding topologies to the plurality of nodes based at least in part on the associated costs, for use by the plurality of nodes in selecting an end-to-end forwarding configuration for the network.

2. The controller of claim 1 wherein the controller is further operative to receive information pertaining to one or more of a current network state, one or more network statistics, and one or more configuration capabilities of the respective nodes, and the at least one or processor is further operative to compute the one or more end-to-end forwarding topologies based at least in part on one or more of the current network state, the one or more network statistics, and the one or more configuration capabilities of the respective nodes.

3. The controller of claim 1 wherein the controller is communicably coupled to a plurality of nodes having an associated local controller and wherein the at least one processor is further operative to forward the one or more end-to-end forwarding topologies to each of the local controllers to pre-provision the one or more end-to-end forwarding topologies at the respective local controllers, and
   wherein each local controller is independently operative to deterministically select and utilize at least one of the end-to-end forwarding topologies as an initial forwarding topology, and to maintain the non-selected end-to-end forwarding topologies as alternative forwarding topologies, and, in response to a change in the network state, to deselect the initial forwarding topology at each local controller, and to independently and deterministically select and utilize at least one of the alternative forwarding topologies at each local controller in place of the initial forwarding topology, wherein the at least one of the alternative forwarding topologies selected at each local controller are the same alternative forwarding topologies.

4. The controller of claim 1 wherein the network has an associated network topology, wherein the controller is operable to receive information pertaining to at least an affinity-network topology that represents a logical combination of the network topology and the affinity topology, and wherein the at least one processor is operable to compute the one or more end-to-end forwarding topologies based at least in part on the affinity-network topology.

5. The controller of claim 4 wherein the controller is further operative to receive information pertaining to one or more of the respective application components, one or more groupings of the application components, one or more logical links between the respective groupings of the application components, and one or more requirements and attributes associated with the logical links between the respective groupings of the application components.

6. The controller of claim 1 wherein the at least one processor is operative to compute circuit switch settings in the computation of the one or more end-to-end forwarding topologies.

7. The controller of claim 1 wherein the at least one processor is operable to compute a list of candidate forwarding trees provisioned to at least some of the plurality of nodes, and compute first weightings assigned to the respective candidate forwarding trees, the first weightings being indicative of an approximate proportion of mappings of which the respective candidate forwarding tree is to be mapped to a corresponding endpoint and mappings of destination addresses to the respective candidate forwarding trees.

8. The controller of claim 1 wherein the at least one processor is operable to compute a list of candidate forwarding paths to be provisioned to at least some of the plurality of nodes, and mappings of source and destination address pairs to the respective candidate forwarding paths.

9. A method of provisioning one or more forwarding topologies in a network including a plurality of nodes, the method comprising the steps of:
   receiving, by a controller, information pertaining to an affinity topology, the affinity topology specifying affinity link attributes that describe policies and attributes for communications between a plurality of application components of the network along affinity links, wherein an affinity link represents a logical link between at least two application components within the network;
   computing, by the controller, one or more end-to-end forwarding topologies based at least in part on the affinity topology, each end-to-end forwarding topology identifying one or more network segments for configuring interconnections between at least some of the plurality of nodes for forwarding traffic through the network, wherein an end-to-end forwarding topology is defined by at least one candidate forwarding path, and a forwarding path identifies at least one network segment for forwarding traffic through the network;
   computing, by the controller, for each path of the at least one candidate forwarding path in the one or more end-to-end forwarding topologies, an associated cost based at least in part on whether the path satisfies affinity link attributes in the affinity topology; and
   providing, by the controller, the one or more end-to-end forwarding topologies to at least some of the plurality of nodes based at least in part on the associated costs, for use by the plurality of nodes in selecting an end-to-end forwarding configuration for the network.

10. The method of claim 9 wherein the network has an associated network topology, wherein the receiving of the information pertaining to at least the affinity topology includes receiving information pertaining to at least an affinity-network topology that represents a logical combination of the network topology and the affinity topology, and wherein the computing of the one or more end-to-end forwarding topologies includes computing the one or more end-to-end forwarding topologies based at least in part on the affinity-network topology.

11. The method of claim 9 wherein each one of the plurality of nodes includes a local controller, the method further comprising:
providing, by the controller, the one or more end-to-end forwarding topologies to each local controller of the plurality of nodes to pre-provision the one or more end-to-end forwarding topologies at the respective local controllers, each end-to-end forwarding topology is further based at least in part on the current network state;
independently and deterministically selecting and utilizing at least one of the end-to-end forwarding topologies as an initial forwarding topology at each local controller;
maintaining the non-selected end-to-end forwarding topologies as alternative forwarding topologies at each local controller;
in response to a change in the network state, deselecting the initial forwarding topology at each local controller; and
independently and deterministically selecting and utilizing at least one of the alternative forwarding topologies at each local controller in place of the initial forwarding topology, wherein the at least one of the alternative forwarding topologies selected at each local controller are the same alternative forwarding topologies.

12. The controller of claim 1 wherein each path in the one or more end-to-end forwarding topologies has an assigned weighting indicative of an approximate proportion of mappings of which the respective candidate forwarding tree is to be mapped to a corresponding endpoint, and
the controller is further operative, in response to at least one of a node failure and a link failure, to shift at least one assigned weighting.

13. The controller of claim 1 wherein the controller is further operative to assign, for each forwarding path in the one or more end-to-end forwarding topologies, a validity value, wherein the validity value indicates whether any node or link on the forwarding path is inoperative.

14. The controller of claim 1 wherein the at least one processor is operative to compute the associated cost for each path in the one or more end-to-end forwarding topologies based on an estimated link utilization for a network link in the path.

15. The method of claim 9 wherein each path in the one or more end-to-end forwarding topologies has an assigned weighting indicative of an approximate proportion the path is to be mapped to a corresponding endpoint, and
the method further comprising shifting at least one assigned weighting, in response to at least one of a node failure and a link failure.

16. The method of claim 9 further comprising assigning, for each forwarding path in the one or more end-to-end forwarding topologies, a validity value, wherein the validity value indicates whether any node or link on the forwarding path is inoperative.

17. The method of claim 9 wherein computing the associated cost, for each path in the one or more end-to-end forwarding topologies, comprises computing the associated cost based at least in part on an estimated link utilization for a network link in the path.

18. The method of claim 9 further comprising receiving, by the controller, information pertaining to one or more of: a current network state, one or more network statistics, and one or more configuration capabilities of the respective nodes, and
wherein the computing of the one or more end-to-end forwarding topologies includes computing the one or more end-to-end forwarding topologies based at least in part on one or more of: the current network state, the network statistics, and the configuration capabilities of the respective nodes.

19. The method of claim 9 wherein the computing of the one or more end-to-end forwarding topologies includes:
computing a list of candidate forwarding trees provisioned to at least some of the plurality of nodes,
computing first weightings that are assigned to the respective candidate forwarding trees, the first weightings being indicative of an approximate proportion of mappings of which the respective candidate forwarding tree is to be mapped to a corresponding endpoint, and
computing mappings of destination addresses to the respective candidate forwarding trees.

20. A controller for provisioning one or more forwarding topologies in a network having a plurality of nodes, the controller comprising:
at least one memory storing program instructions; and
at least one processor operative to execute the program instructions to:
receive information pertaining to an affinity topology, the affinity topology specifying policies and attributes that describe communications between a plurality of application components of the network;
compute one or more end-to-end forwarding topologies based at least in part on the affinity topology, each end-to-end forwarding topology identifying one or more network segments for configuring interconnections between the plurality of nodes for forwarding traffic through the network, wherein each end-to-end forwarding topology is defined by at least one candidate forwarding path, and a forwarding path identifies at least one network segment for forwarding traffic through the network;
compute, for each path of the at least one candidate forwarding path in the one or more end-to-end forwarding topologies, an associated cost based at least in part on an estimated link utilization for a network link in the path of the at least one candidate forwarding path; and
provide the one or more end-to-end forwarding topologies to the plurality of nodes based at least in part on the associated costs, for use by the plurality of nodes in selecting an end-to-end forwarding configuration for the network.

21. The controller of claim 20 wherein the controller is further operative to receive information pertaining to one or more of a current network state, one or more network statistics, and one or more configuration capabilities of the respective nodes, and
the at least one processor is further operative to compute the one or more end-to-end forwarding topologies based at least in part on one or more of the current network state, the network statistics, and the configuration capabilities of the respective nodes.

22. The controller of claim 20 where the plurality of nodes each have an associated local controller and wherein the controller is further operative to forward the one or more end-to-end forwarding topologies to each local controller to pre-provision the one or more end-to-end forwarding topologies at each respective local controller, and wherein each local controller is independently operative to deterministically select and utilize at least one of the end-to-end forwarding topologies as an initial forwarding topology, and to maintain the non-selected end-to-end forwarding topologies as alternative forwarding topologies, and, in response to a change in the network state, to deselect the initial forwarding topology at each local controller, and to independently and deterministically select and utilize at least one of the alternative forwarding topologies at each local controller in place of the initial forwarding topology, wherein the at least one of the alternative forwarding topologies selected at each local controller are the same alternative forwarding topologies.

23. The controller of claim 20 wherein the network has an associated network topology, wherein the controller is operable to receive information pertaining to at least an affinity-network topology that represents a logical combination of the network topology and the affinity topology, and to compute the one or more end-to-end forwarding topologies based at least in part on the affinity-network topology.

24. The controller of claim 23 wherein the controller is operative to receive information pertaining to one or more of the respective application components, one or more groupings of the application components, one or more logical links between the respective groupings of the application components, and one or more requirements and attributes associated with the logical links between the respective groupings of the application components.

25. The controller of claim 20 wherein the at least one processor is operative to compute circuit switch settings in the computation of the one or more end-to-end forwarding topologies.

26. The controller of claim 20 wherein the at least one processor is operative to compute a list of candidate forwarding trees provisioned to at least some of the plurality of nodes in the computation of the one or more end-to-end forwarding topologies, first weightings assigned to the respective candidate forwarding trees, the first weightings being indicative of an approximate proportion the respective candidate forwarding tree is to be mapped to a corresponding endpoint, and mappings of destination addresses to the respective candidate forwarding trees.

27. The controller of claim 20 wherein the at least one processor is operative to compute a list of candidate forwarding paths to be provisioned to at least some of the plurality of nodes in the computation of the one or more end-to-end forwarding topologies, and mappings of source and destination address pairs to the respective candidate forwarding paths.

28. The controller of claim 20 wherein the controller is further operative to assign, for each forwarding path in the one or more end-to-end forwarding topologies, a validity value, wherein the validity value indicates whether any node or link on the forwarding path is inoperative.

29. The method of claim 9 wherein computing, by the controller, the one or more end-to-end forwarding topologies includes computing, by the controller, circuit switch settings for circuit switches within the at least some of the plurality of nodes.

30. The method of claim 29 wherein the method further comprises:
receiving the one or more end-to-end forwarding topologies at the at least some of the plurality of nodes, the one or more end-to-end forwarding topologies including the circuit switch settings; and
configuring one or more of the circuit switches within the at least some of the plurality of nodes, by the respective node, according to the circuit switch settings to affect at least an underlying physical topology of a topology plane in accordance with an end-to-end forwarding topology in the one or more end-to-end forwarding topologies.

31. The method of claim 1, wherein the at least one processor is operable to compute, for each path of the at least one candidate forwarding path in the one or more end-to-end forwarding topologies, the associated cost based at least in part on whether the path satisfies affinity link attributes in the affinity topology and, for each affinity link, a multiplicative factor representing an importance of satisfying the affinity link.

* * * * *